United States Patent [19]
Nguyen

[11] Patent Number: 5,544,302
[45] Date of Patent: Aug. 6, 1996

[54] OBJECT-ORIENTED FRAMEWORK FOR CREATING AND USING CONTAINER OBJECTS WITH BUILT-IN PROPERTIES

[75] Inventor: Frank T. Nguyen, Campbell, Calif.

[73] Assignee: Taligent, Inc., Cupertino, Calif.

[21] Appl. No.: 71,812

[22] Filed: Jun. 3, 1993

[51] Int. Cl.⁶ .................................................. G06F 15/00
[52] U.S. Cl. ................................................... 395/161
[58] Field of Search ..................................... 395/155, 156, 395/157, 158, 159, 160, 161

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,899,136 | 2/1990 | Beard et al. | 340/706 |
| 4,953,080 | 8/1990 | Dysart et al. | 364/200 |
| 4,974,173 | 11/1990 | Stefik et al. | 364/521 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,065,347 | 11/1991 | Pajak et al. | 395/159 |
| 5,072,412 | 12/1991 | Henderson, Jr. et al. | 395/159 |
| 5,075,848 | 12/1991 | Lai et al. | 395/425 |
| 5,093,914 | 3/1992 | Coplien et al. | 395/700 |
| 5,107,443 | 4/1992 | Smith et al. | 395/158 |
| 5,119,475 | 6/1992 | Smith et al. | 395/156 |
| 5,121,478 | 6/1992 | Rao | 395/157 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,159,669 | 10/1992 | Trigg et al. | 395/159 |
| 5,181,162 | 1/1993 | Smith et al. | 364/419 |
| 5,287,447 | 2/1994 | Miller et al. | 395/157 |
| 5,305,435 | 4/1994 | Bronson | 395/159 |

FOREIGN PATENT DOCUMENTS 520924  12/1992  European Pat. Off. .

OTHER PUBLICATIONS

Budd, Timothy; *A Little Smalltalk*, Addison–Wesley Publishing, 1987, pp. 3–19, 22–32.

*Primary Examiner*—Mark R. Powell
*Assistant Examiner*—Robert G. Andrews
*Attorney, Agent, or Firm*—Keith Stephens

[57] ABSTRACT

An object-oriented framework is used to create container objects which are, in turn, used to hold both other objects and information in order to organize the information in a variety of ways. The framework contains a set of pre-defined class information which allows container objects to be constructed or instantiated. An instantiated container object can be accessed by a multitude of users and may contain other objects which can hold information defining other containers, such as shelves and trash cans, or which can hold information representing physical "things" such as locations, maps and people. The pre-defined class information includes member functions which provide default editing operations such as cut, copy, paste, drag, drop, selection, move, undo and redo, which editing operations are applicable to all objects in the container. Member functions are also provided to generate one or more presentations on a display which represent the container.

24 Claims, 29 Drawing Sheets

OBJECT-ORIENTED FRAMEWORK FOR CREATING AND USING CONTAINER OBJECTS WITH BUILT-IN PROPERTIES

CROSS-REFERENCE TO RELATED PATENT APPLICATIONS

This application is related to the application entitled "Object Oriented Framework System," by Debra L. Orton, David B. Goldsmith, Christopher P. Moeller, and Andrew G. Heninger, filed Dec. 23, 1992, given Ser. No. 07/99,617, and assigned to Taligent, Inc., the disclosure of which is hereby incorporated by reference. This application is also related to the application entitled "Concurrent "Framework System," by Jack Palevich et al., filed Feb. 26, 1993, given Ser. No. 08/023,987 and assigned to Taligent, Inc., the disclosure of which is hereby incorporated by reference.

FIELD OF THE INVENTION

This invention generally relates to a method and system for organizing and accessing various information within an object oriented operating system, and more particularly to the interaction of users within distinct container objects.

BACKGROUND OF THE INVENTION

It is increasingly important to provide a user interface that is built around providing a sense of community in the interface. That sense of community comes from having representations for people, places, and other items such as tools, appliances, stationary, and documents. Early attempts at providing an ergonomic interface used a desktop metaphor such as that found in the Xerox Star computer system, and its followons and patented in U.S. Pat. Nos. 5,107,443; 5,072,412; 5,159,669; 4,974,173; and 5,121,478.

SUMMARY OF THE INVENTION

Users of computer systems, especially inexperienced users, benefit from an application that creates an environment with characteristics of the real world. In particular, a user who is inexperienced with the application will readily grasp the concepts of the application utilizing a familiar frame of reference. A preferred embodiment provides such an environment by enabling a user to create a set of place objects wherein other objects can be contained. Such other objects include functional representations of persons, things or items, and other places.

A preferred embodiment organizes information in a computer system within a plurality of containers in the memory of a computer. The organization is initiated by instantiating a container in the memory and tailoring the container to a class of objects such as as folders, in baskets or places. Containers inherit default user operations including cut, copy, paste, drag, drop, selection, move, and the ability to back out of operations already performed. A container can also provide a window, frame, thumbnail or icon presentation on a display and support for multiple presentations of the same container. For example, a folder and a rolodex may be displayed for the same container object.

BRIEF DESCRIPTION OF THE DRAWINGS

The foregoing and other objects, aspects and advantages of the present invention will be better understood from the following detailed description of the preferred embodiment of the invention with reference to the accompanying drawings, in which.

DETAILED DESCRIPTION OF THE PREFERRED EMBODIMENT OF THE PRESENT INVENTION

Users conceptualize places as areas in which persons, places and things exist. Place objects are created to capture the formal and functional characteristics of actual locations. Place objects build upon knowledge of the real world by organizing and segmenting information into a familiar and meaningful context. Furthermore, a preferred embodiment provides a context for meaningful interaction between users and a computer system.

A preferred embodiment organizes information within persistent structures referred to as "places". Information, in the form of other objects such as persons and documents, is appropriately segmented among place objects. As an example, a post office place is created containing a set of objects pertaining to a communication resource. Place objects can also be created to contain objects that pertain to persons associated with a place. As a further example, a library place is created wherein objects representing a volume of books and a librarian are placed. A user could access the library place and sort through the volume of books in order to find a desired book which can then be retrieved. Otherwise, a user may choose to contact the librarian, through information contained within the object representing the librarian, to have the librarian undertake a literature search.

COMPUTER SYSTEM

Figure 1:
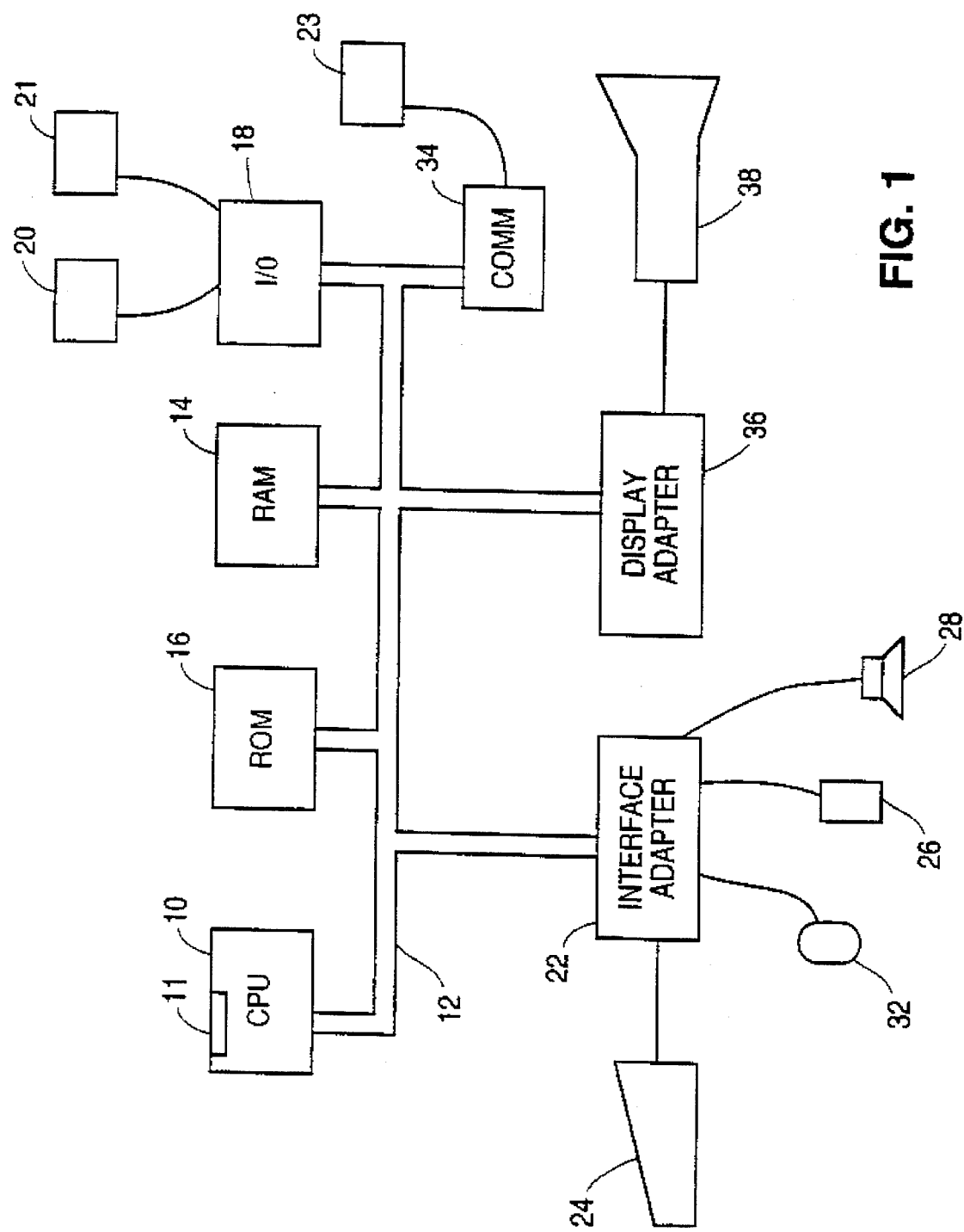
FIG. 1 is as block diagram of a computer system in accordance with a preferred embodiment.

A preferred embodiment is preferably practiced in the context of an operating system resident on a personal computer such as the IBM® PS/2® or Apple® Macintosh® computer. A representative hardware environment is depicted in FIG. 1, which illustrates a typical hardware configuration of a workstation in accordance with a preferred embodiment having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7® operating system. The document framework architecture is resident in the RAM 14, and under the control of the CPU 10, is responsible for implementing a preferred embodiment of the invention.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, *Reusing Object-Oriented Designs,* University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a prefabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, .or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the s problem gets solved once and the business rules and design are enforced and used consistently. Also, frameworks and the embodied expertise behind the frameworks have a strategic asset implication for those organizations who have acquired expertise in vertical markets such as manufacturing, accounting, or bio-technology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on what level of the system you are concerned with and what kind of problem you are trying to solve. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NEXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create; customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using systems framework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

COLLABORATION MODELS

Inherent collaboration models support the function and communication style of a particular place object. In particular, a preferred embodiment can support the following collaboration models: (i) screen sharing; (ii) annotation merging; and (iii) document merging. Accordingly, a user selects a collaboration model to conform to a created place object.

These three collaborative models provide users access to objects in different ways. Users may view objects in real time through the screen sharing collaboration model. In contrast, users may contemporaneously access different portions of an object through the annotation and document merging collaboration models.

Certain place objects will have intrinsic collaboration styles which complement the purpose of that place object. Accordingly, collaboration arrangements could include: broadcast screen sharing; interactive screen sharing; telephony; shared white boards, projects or documents; bulletin board threads which is annotated; video conferencing; or, any combination thereof.

The screen sharing collaboration model displays all objects within a place that exist on a host workstation to a number of users on other workstations. However, all objects existing on workstations other than a host workstation will not be displayed until moved to the host workstation. The screen sharing model requires all users to share the same view of a place object.

Screen sharing can support different kinds of interaction in different place objects. For instance, in a small group meeting of several designers, drawings is analyzed and modified in real-time even though each designer is in a different location. Each designer would possess the ability to modify the drawing. In a further instance, a place object could be a lecture room of a school wherein a presentation is being broadcast from one user to a group of other users. The user giving the presentation will be able to create a multimedia talk and present it to the rest of the class. During the presentation, members of the class may not be able to do anything to change the presentation of the lecturer. However, the other users may take notes and perhaps engage in discussions among themselves.

Objects that can be annotated or merged, such as documents, are opened by all users for purposes of viewing. The view of each user with respect to the document will, however, be different. Several users may thus annotate or merge a document simultaneously. This is possible since no user shares a common view with another. Hence, each user engaging in a annotation merging or object merging collaboration can work on different parts of a document.

The collaboration models of object merging and annotation merging open objects, such as documents, within a place object to several users at once wherein each user can view a different portion of the object. For instance, a user may write an introduction to a document while another user is writing a conclusion. In this instance, the open document would not be automatically visible to each user within the collaboration. Rather, each user would open and edit a copy of the document that is later reconciled with the main document.

Accordingly, objects within a place object are supported based upon the collaboration model which is supporting the object. The collaboration model of screen sharing opens an object to all users within the collaboration. Since each user within a screen collaboration is tied into one view of the data, only one part of the file document is worked upon at one at one time. For example, all users will be able to make changes to a graphic document since most graphics programs support full screen views that contain all of the data in the graphic document. Word processing documents are, however, different since they are multi-page documents. Thus, all users within the collaboration can only view and work upon one page at a time on the display. Thus, all open word processing documents on the workstation of the host will be viewed by all.

Inherent Characteristics of a Container

A container has the following inherent characteristics:

It can contain objects. Whereas workspace containers (e.g., folders and places) only hold workspace objects (e.g., documents, folders), other special-purpose containers may hold other types of objects. For example, a database container can hold the result of a database query. Deleting an object from a container removes the object's model (in-memory structure) and model store (on-disk structure) from the system.

It can contain reference links to objects and provides the scope for fixing-up these links when the referred-to objects are copied from one container to another. Deleting a reference from a container only removes the reference, and does not affect the referred-to object's model and model store. Non-June containers can also hold references to objects: containers and references are not tightly coupled.

It can form a containment hierarchy which is independent of file system hierarchy. In other words, users are free to organize the information in their workspace using containers, regardless of where or how the information is stored in the file system. A container can span multiple volumes. If all the volumes are not available then the unavailable objects are not shown or grayed out. The container itself, i.e., the root of the containment hierarchy, lives in its enclosing place and belongs to the same storage domain (network:machine:volume) as the place.

PLACE OBJECTS WITH A DISPLAY INTERFACE

Place objects are hierarchical and are the highest-level objects in a user interface. Accordingly, all interaction and communication occurs within the context of some place object. Each user has their own home place object. The home place object is the primary, top-level place object which appears to a user upon commencement of a session. Navigation between places is possible once the user adds more place objects to the home place or desires remote access to places. A user can create what are referred to as sub-places within the home place.

Place objects can be segmented by characteristics such as task, project, and collaboration model. Once a place reaches a large size, a user may subdivide that place into smaller places. Place objects which encompass an entire desktop display, however, can also appear in a window.

Place objects, not applications, are employed for organizing and structuring information. According to the specific demands of their work in a given place object, users can insert objects within that place to facilitate that work. Such objects include file documents, tools, and containers. Once contained within a place object, objects can be arranged and maintained in a desired manner. For example, in the workspace of a place object where home financing is undertaken, a user might insert objects such as a ledger, a check book, and an on-line connection to the local bank. When the place object is closed and reopened, the objects within the workspace of the place object appear in the same manner in which they were left.

A user can simultaneously access and display multiple place objects by opening one or more places into window-based place presentations in addition to the desktop place presentation. Place objects within a window possess all of the attributes associated with desktop place objects. This feature allows a user to decrease the size of a place object window in order to display multiple place object windows. A user may open a set of place objects within a window. Consequently, a user can readily move and copy objects between the multiple place object windows. Furthermore, a user can proficiently navigate between the multiple place objects.

Figure 2:
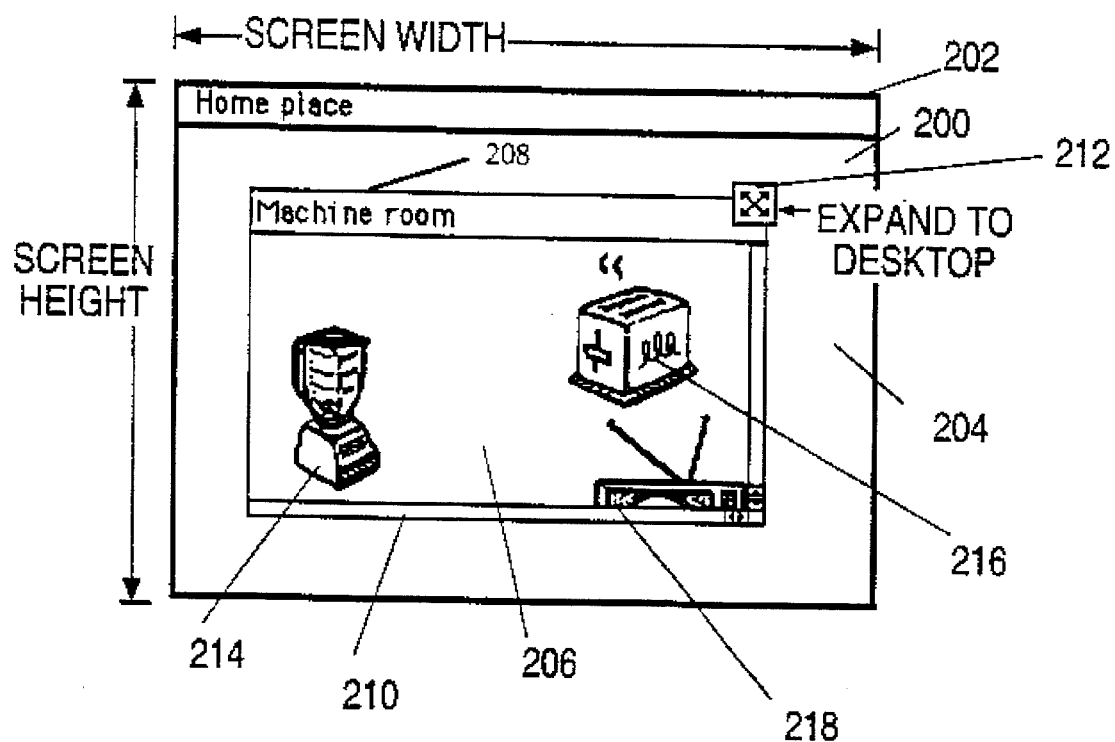
FIG. 2 illustrates a place object within a window and a place object of the desktop in accordance with a preferred embodiment.

Referring to FIG. 2, a window place within a desktop place is illustrated. Place object 200 is entitled "Home place" as indicated by title bar 202. Workspace 204 of place object 200 encompasses the entire desktop display. Also appearing within FIG. 2 is place object 206. Place object 206, entitled "Machine room" as indicated by title bar 208, is enclosed within a window and possesses workspace 210. Fully displayed objects 214 and 216, and partially displayed object 218 are located within workspace 210 of place object 206. Place object 206 further possesses control 212 which allows place object 206 to be expanded.

Figure 3:
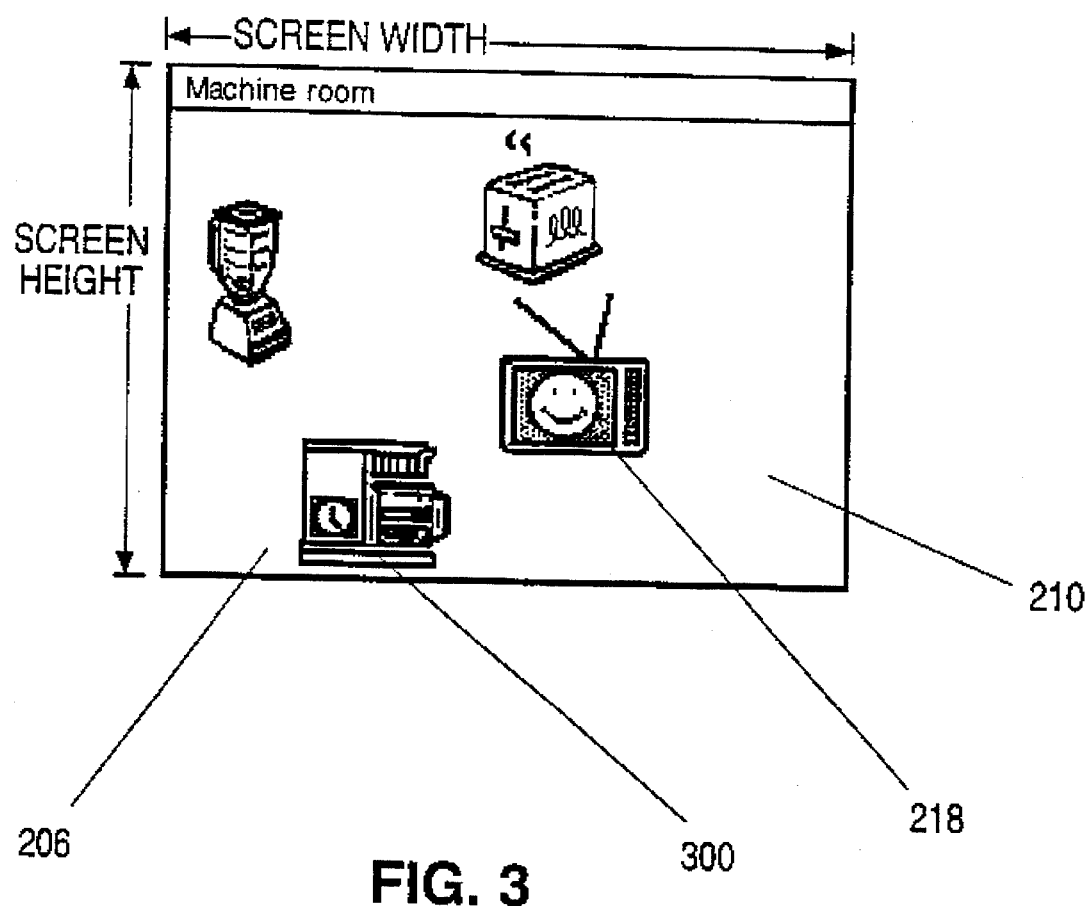
FIG. 3 illustrates the ,expansion of a place object within a window in accordance with a preferred embodiment.

Referring to FIG. 3, place object 206 of FIG. 2 is illustrated upon expansion. By dragging control 212 of place object 206, as shown in FIG. 2, place object 206 is expanded to its full size which is the size of the entire desktop display. Consequently, object 218 and object 300 are fully revealed within workspace 210 by enlarging place object 206 to the size of the desktop display.

A preferred embodiment is capable of supporting multiple users that share a single workstation wherein each user has a home place object where their personal information data resides. Each user can then create sub-place objects within their home place object in order to partition the personal information.

Figure 4:
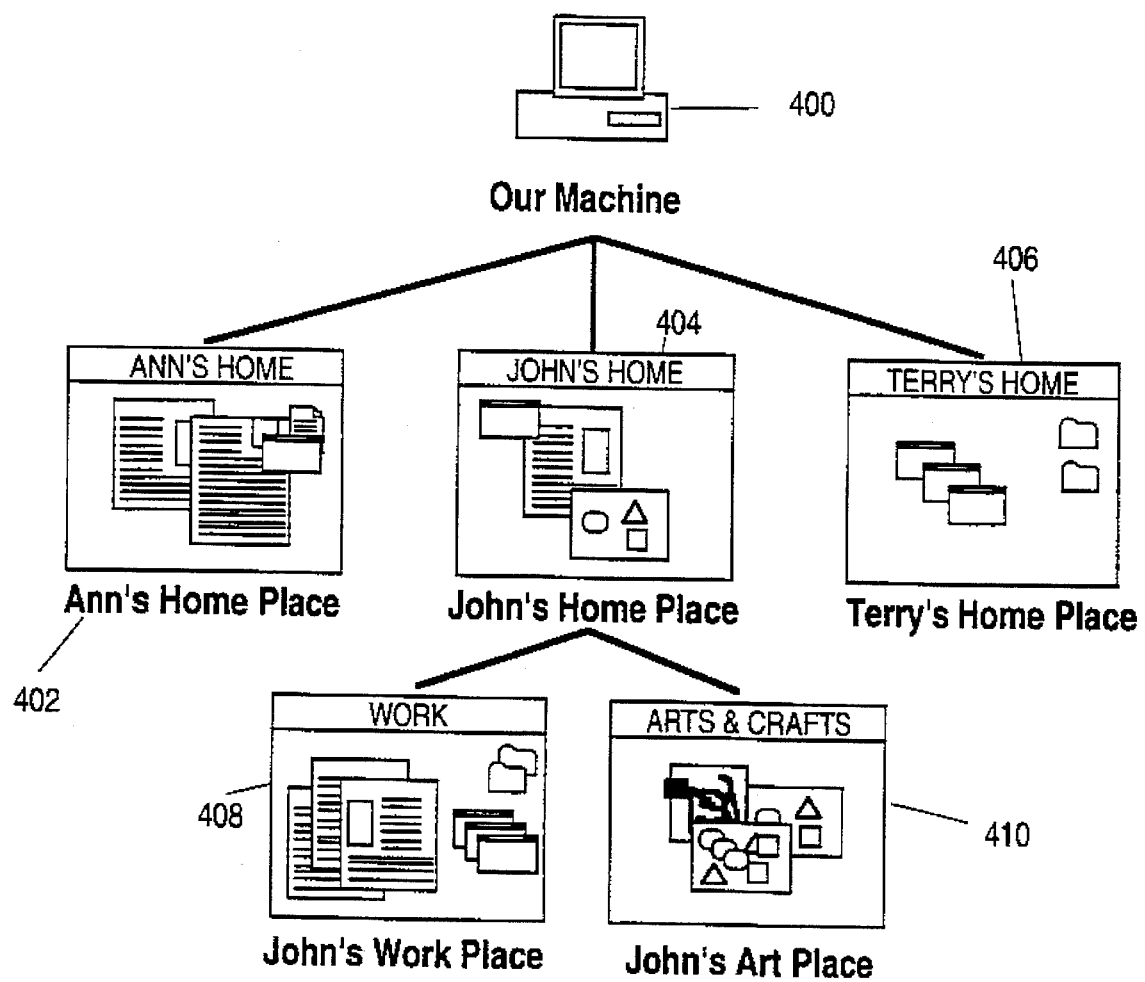
FIG. 4 illustrates a typical hierarchy of user place objects within a workstation in accordance with a preferred embodiment.

Referring to FIG. 4, a typical hierarchy of user place objects within a workstation is illustrated. Workstation 400 is shared by three users named Ann, John and Terry. Each such user possesses a home place object depicted at 402, 404 and 406, respectively. Further, home place object 404 (John's Home Place object) is further decomposed into sub-June place object 408 (John's Work Place object) and 410 (John's Art Place object).

A workstation can also have other place objects on it which are not associated with a specific user. Such place objects preferably include a guest place object, a log-in place object, a system maintenance place object and a transfer place object. A guest or public place object permits access by users who are not known to the workstation. A log-in place object contains objects and information relating to the commencement of user sessions. A system maintenance place object permits a user to perform maintenance tasks and contains a machine room. The machine room contains persistent configuration information about the workstation and may not be associated with a specific user. A transfer place object permits for the storage and transfer of information among users of the workstation.

ACCESSING PLACE OBJECTS

There are a number of ways to access and navigate between place objects, including: (i) a resource book; (ii) within a representation of a map; (iii) using a reference to a place, such as a postcard; and (iv) an invitation.

A resource book provides access to place objects by presenting information to a user within the context of a book. The information contained within the communication book regards objects, referred to as resources, that exist within a name service directory. Resources that are made accessible through a resource book thus include objects such as a person or place. Hence, a resource book provides a means by which place objects can be found and accessed.

Within the resource book exist one or more tabs for place objects within the resource book wherein information describing the place objects is contained. Such information may include the objects located within the place object, and a cost associated with accessing the place object. The resource book facilitates the finding of a place object and thereafter enables a user to bring the place object within a local workstation as a persistent reference. Accordingly, a selected place object represented within a resource book, as possibly a postcard which is discussed below, can be dragged from the resource book onto the desktop display of a workstation for future access to the place object.

A map is a spatial representation of place objects. Maps include a set of place objects that are connected in some manner. Thus, a user can travel upon the map to locate a place object known to exist within a certain area. Through the use of animation and sound, maps can provide context and a sense of transition as a user moves from one place object to another.

The map uses a spatial view to provide access to various place objects that are designated by a user. Users can use the map to create new place objects and manipulate existing place objects. Maps are interactive. Accordingly, a user may utilize a map to: (i) open a place object by double-clicking its reference on the map; (ii) drag references such as postcards from the map to an acceptable container; (iii) move files by dragging them from the current place object to a reference to another place object on the ma; and (iv) change the properties of one or more place objects by selecting one or more place objects, opening a property sheet, and specifying the new properties of the selected place objects.

A map can also provide context and a sense of transition as a user moves from place object to place object. For example, when .a user exits a first place object and travels to a second place object, a map shows the movement between places by illustrating an animation, e.g., a line between two objects. Such an animation sequence provides location context for the two place objects. First, the sequence relates a sense of transition. Second, the sequence reminds the user that the map is always available for traveling from one place object to another.

Postcards are references to place objects. Postcards are formed by a user accessing a place object that is desirable of being returned to. Then, by forming a postcard of the accessed place object to facilitate future access to that place object. Such a postcard can also be forwarded to other users so as to alert the users to the existence of the place object as well as provide access information.

Invitations, which are also references to place objects, enable specific users to access a place object at specific times. This action allows a creator of a place object to designate selected users to access a place object for a limited duration and subject to specified restrictions. Since some place objects may charge for access, an invitation may allow a user to receive a trial access to a place object. An invitation can specify that a user can have access to a place object at a given date and time; thus acting as a simple access control mechanism. Furthermore, invitations can also be employed to solicit other users to join in collaborations. Since it would not be appropriate to insert a person within a collaboration without prior notice, an invitation could be forwarded to give the user the option of joining into the collaboration.

Figure 5:
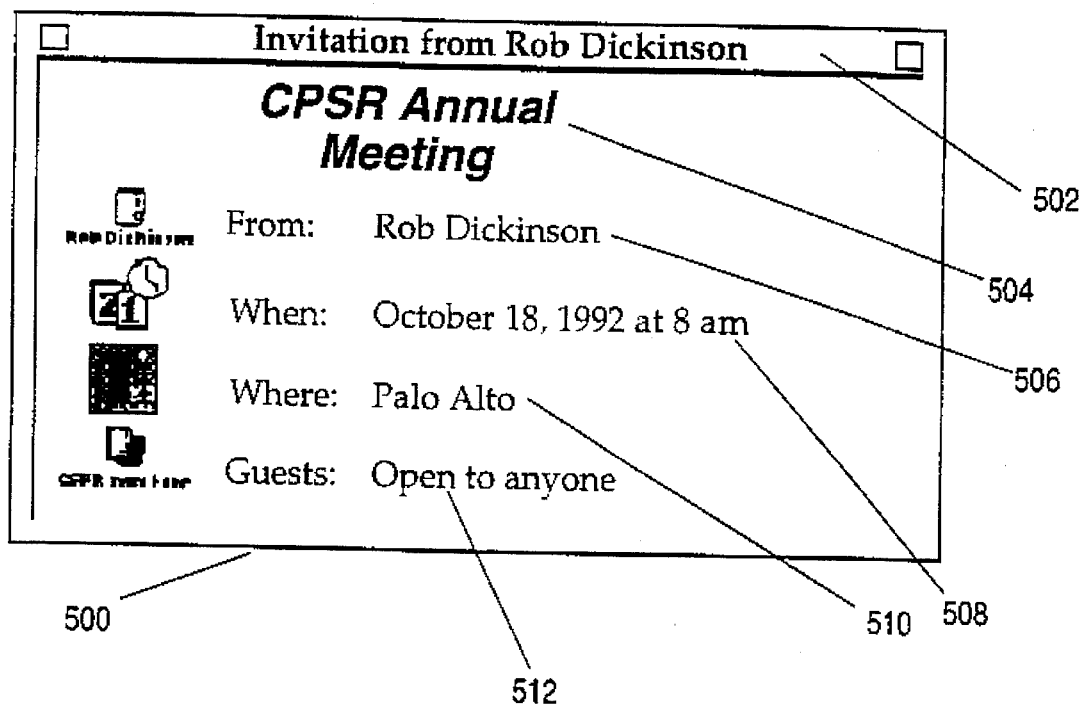
FIG. 5 illustrates an invitation in accordance with a preferred embodiment.

Referring to FIG. 5, an invitation is illustrated. Invitation 500, an "invitation from Rob Dickinson" as denoted by title bar 502, contains information regarding a "CPSR Annual MEETING" as indicated by heading 504. Information regarding the person forwarding the invitation, the time of the meeting, the place of the meeting, and the designated guests is also disclosed within the invitation at reference numerals 506, 508, 510, and 512 respectively.

Once a desired place object is located, a user must navigate between place objects that are sub-places. The navigation method selected by the designer of a place object is an important characteristic of a place object. Since place objects are hierarchical, a user will need to know if a place object is within a deep nested structure or a shallow structure. Deep nesting may mean that the user must open successive sub-place objects, or use references to get to a deeply nested place object. In contrast, a shallow structure with many elements will take up more room spatially and thereby potentially give the user a greater number of choices at higher levels. Hence, the navigation method chosen by a creator depends upon the structure of the place object desired to be reached.

Preferably, a combination of scaling and panning methods are used to navigate within a desktop display. Uniform scaling of a place object involves expanding or reducing the dimensions of a place object while maintaining a constant aspect ratio. Scaling is also important to users who zoom into and out of a document or place object view. Once a place object is satisfactorily scaled, panning allows for navigation within the place object. Panning involves manually directing the desktop, by moving a graphic cursor, to display a particular portion of a place object. By dragging the panning graphic, the user moves other regions of the desktop into view.

Alternatively, a preferred embodiment employs scrolling, auto panning or distorting methods for navigating within a place object. Auto-panning detects the motion of a cursor into a hot-zone, usually the area around the edge of the desktop, and pans the display in the direction of the movement. The system also provides users with a mechanism by which queries are directed to locate certain place objects or certain contents of a place object.

ACCESS LIMITATIONS

Security and access control within place objects can be implemented in several ways. First, a single set of access rights could be associated with a place object. Thus, any user within such set of access rights is permitted to access a place object. Second, minimum access rights to a given place object could be maintained to a designated set of persons. Increased access rights would, however, be associated with objects contained within the place object. Third, access rights can be specifically assigned to individuals and groups for the place object and those rights would apply throughout the place object and contained objects. These rules provide for different levels of sharing within the place object without requiring individual file management.

As a further method for limiting access, costs can be levied upon a user accessing a place object. Accordingly, place objects can be utilized as a means of providing services. Such services could include information services such as Dow Jones, news services such as the Wall Street Journal, purchasing services and gathering place objects such as America On-line. Place objects can be constructed for providing services and controlling access to the services.

Several models for determining a cost for a user entry to a place object are enabled. In particular, costs can be based upon any one or a combination of the following: (i) access to a place object; (ii) access time to a place object; (iii) objects accessed within a place object; (iv) a fixed cost or subscription; (v) predetermined usage limits; or, (vi) any combination thereof.

Preferably, notification of the incurred costs and potential costs are displayed to a user upon access to a place object. In addition, a user is forewarned of potentially expensive operations. Moreover, a user can designate a maximum cost for a given place object. When such cost is reached, the user is notified and can either choose to exit the place object or assume the additional costs that will be incurred.

VISUAL REPRESENTATION OF A PLACE OBJECT

The visual representation of a place object is important for creating a sense of location. Accordingly, a place object can be designed for a number of elements including the background image, layout, scale, design style, spatial volume, lighting effect and typography. A preferred embodiment combines these elements to create environments which are distinctive and which facilitate navigation.

The background image applied to a place object can be formed through any read-only model. This includes moving images or images that are data-driven such as a night/day place object which changes its presentation based on the current time. Further, a background image of a place object may be blurred to add depth stratification between background images and items such as windows and object icons in the forefront of a display. Saturation can also be employed to create a distinct style between the foreground items and background image.

The density and layout of a place object are adapted to satisfactorily reflect the place object. Any layout changes that a user makes to a place object are saved and restored upon return unless the place object only allows read-only access. The relation of the background image to the scale and proportion of the dimensions of a place object establish the sense of scope of a user. Accordingly, a small and receding place object indicates distance, while a larger place object represents the vastness of a place object.

The spatial volume of a place object is critical to the representation of the place object. The selection, placement and rendering of objects in a place object indicate the range of options available to a user. Some place objects are readily comprehensible to a user while others invite further analysis by opening and reading. Nevertheless, place objects are readily distinguishable by viewing the elements contained within a place object. Furthermore, the depth of a space and interaction methods of navigation are characteristics of place objects. Implementation of special virtual realities provide use of three-dimensional input devices and navigation.

The elements of lighting and typography aid in providing each place object with distinct characteristics. Place objects may be designed by focusing attention upon a particular aspect of a place object. Typography, such as display typefaces used at large sizes, can also be employed to provide distinctive features to a place object.

OBJECTS OTHER THAN PLACE OBJECTS

As among place objects and other types of objects within a workspace, place objects are the highest level object. Accordingly, it is within the context of place objects that typical objects, which include container objects, such as folders, are found. Moreover, container objects, such as folders, cannot contain place objects. Container objects can only contain references to place objects such as postcards.

Place objects can contain a multitude of other objects. Such objects include documents, containers, appliances, tools, stationery, and references to persons. Place objects may also contain other place objects which are referred to as sub-place objects. Place objects can also contain references to other place objects. Hence, a hierarchy of place objects can be maintained to allow for further subdivision of related objects.

A preferred embodiment allows for the creation of objects which can be inserted within the workspace of shared place objects. For example, bulletin boards inserted within a place object to allow persons that have accessed a place object to exchange information with each other. Further, business cards can be inserted within a place object to allow persons to contact the person represented by a business card.

A preferred embodiment allows a user to access selected objects while navigating through place objects by two methods. The two methods include a portable container and a workspace shelf. Portable containers, which are visually represented as a backpack or briefcase, are employed to contain references to objects such as documents, containers and tool palettes. Such objects are available within each accessed place object, including shared place objects. To share or copy a carried object into a collaborative place object, however, the object is dragged out of the container into a shared space.

A workspace shelf is a temporary repository for data that a user is moving from one place object to another. A workspace shelf, visible on the display at all times, facilitates user operations by presenting workspace objects which can be directly accessed from the shelf.

Figure 6:
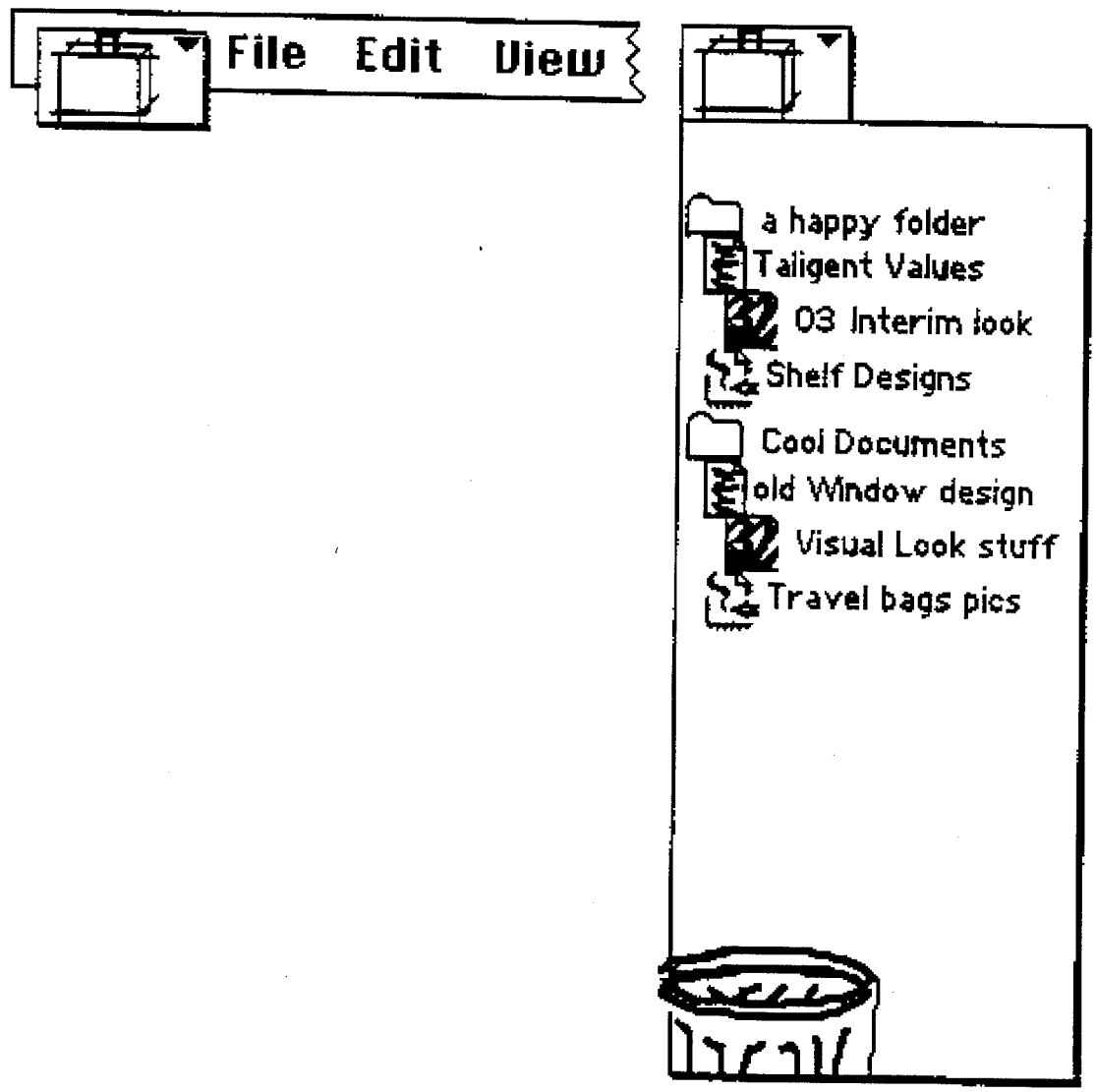
FIG. 6 illustrates a travel bag in accordance with a preferred embodiment.

Referring to FIG. 6, a workspace shelf is illustrated. Desktop 600 contains menu 602 along with shelf 604 which is open and shelf 606 which is closed. Shelf 604 and shelf 606 possess cord 608 and cord 610, respectively. Accordingly, cord 608 was dragged with a mouse pointer to open shelf 604. In contrast, cord 610 was not dragged thus shelf 6 0 6 remains closed. The opening of shelf 604 produces two workspace objects that are represented by icons 612 and 614, respectively. By double clicking a mouse pointer on a workspace object icon, the workspace object is accessed or opened.

Instead of employing a workspace shelf or a portable container, a user may choose to move one object to another object by direct manipulation. Direct manipulation simply calls for an object to be selected, dragged until dropped in a target object. The dragged object contains information concerning type, content and origin information such as "read and write" or "read-only" attributes. The target object uses such information to determine what exchange should take place between the dragged object and target object. That is, what exchange should be taken pursuant to default conditions. In particular, a preferred embodiment allows for the following five types of exchanges: (i) reject; (ii) copy; (iii) move reference; (iv) send copy; and (v) move. Preferably, place objects and persons have "move reference" as default conditions for dragged objects.

Preferably, the arrangement of objects contained within a place object is maintained separately for each user associated with a workspace. Thus, every user of a given place object has a state associated with the place object which depicts the place object as it was last rearranged by the user. The user state is saved on the local workstation of the user. Alternatively, a given place object can be maintained within one single state where all users who access the place object view the place object in the same manner.

Objects can be deleted from the workspace of a place object by moving icons to a trash icon and thereafter selecting a command to empty the trash. Preferably, all workspace objects can be deleted through only one trash object. Further, such trash object displays target acceptance when objects to be deleted are dragged over the trash icon and thereafter display visual feedback when the dragged object is contained therein. Moreover, the trash object can be opened to view the elements contained therein.

PERSONS REPRESENTED WITHIN A PLACE OBJECT

A person object is only utilized to indicate the presence or absence of a person from a given place object. For instance, when a user creates a place object, a person object of the user, is preferably formed within the created place object. Thus, other users accessing the place object are made aware of the presence of the user through the existence of the formed person object. In contrast to person objects, references to persons do not indicate the presence or absence of a person within a place object. Rather, references to persons provide information about a person and the manner of communication with that person. For instance, business cards that are situated within a place object inform users how to contact the person referred to within the business card.

In addition to representing a person as a person object, other aspects of presence can be depicted. Such aspects include whether: (i) a given place object is the active or principal place object of the user; (ii) the interest level of a person, that is, whether the attention of the person is divided among a number of other place objects; (iii) the activity level of a person within a place object; and (iv) the availability of a person for communication.

A preferred embodiment can relate whether a given place object is the active place object of a person. That is, whether a person who is represented within a given place object is currently present within the given place object. This determination is only necessary when a person is in more than one place object simultaneously through the utilization of window place objects. Further, objects within a given place object, such as a contained document, can also be depicted as being viewed by a specific person.

The interest level, or level of attention, of a person relates to the number of place objects which a user is currently associated with. Accordingly, a user who is present within three place objects probably has less attention in any one of them than someone who is solely present within one place object. Further, as with the aspect of an active place object, the relationship of being in a place object and being involved in a contained document is also considered in rendering an interest level.

The activity level of a user denotes whether a user is currently undertaking any activity within a place object or has recently undertaken an activity. Thus, a high degree of inactivity might indicate that the person is no longer in their office or at their desk. Such information is useful when attempting to contact a person that has a high degree of inactivity.

The aspect of availability of a person can also be related by a preferred embodiment. That is, whether or not the person is available to communicate or be communicated with. Although a preferred embodiment provides for diverse forms of group communication, persons can also elect to work undisturbed. Accordingly, a user may indicate a state of unavailability wherein no communication from other users will be permitted. Thus, a state of unavailability is related by representing a person within a place object with an indication of the desire of the person to be left undisturbed.

Other types of specific information, concerning a person represented within a place object, is related to a user. Such information may include the name of the person, the physical location of the person, whether the person is on-line, the level of privilege on each document being shared by the person, the title of each document being shared, and which parts of the document the person is working on. This specific information can be retrieved through a "GetInfo" command with respect to a given person.

A preferred embodiment enables a person to be represented through different identities. Specifically, a person to be represented within a place object can be represented by either a photographic image or another less personal representation. Further, persons can have their identity remain anonymous or use a pseudonym instead of representing persons by their true identity. Moreover, the identity of a person performing an action within a given place object can be concealed.

A place object may require a certain level of identification before access by a user. For instance, a place object may require all users that access a place object to be represented by their true identity. Other place objects, such as a gathering place object, allow users to employ pseudonyms for their true identities. Still other place objects, where confidentially is of the essence, may conceal all identities for those who access and participate with the object.

In order to have a user preference correspond to a required level of identity of a place object, a negotiation mechanism is employed. The negotiation mechanism allows a user to select a proper identity based on the required level of identity of a place object. For example, a user may desire to be anonymous by default. In the event that a user attempted to access a place object requiring the true identity of each user, the user is prompted with a message that states that the place object does not allow anonymous entries. Then, the user is prompted again for entry. Thus, a user is given an opportunity to adapt a preferred identity based upon the existing circumstances when the preferred identity is insufficient.

Preferably, persons are represented within the workspace of a place object along with the other contained objects of the place object. Alternatively, persons can be depicted within another medium not physically within the workspace of a place object. Such mediums include: (i) a separate window; (ii) a slide-out drawer that displays the persons when opened; and (iii) a menu which displays a palette of connected persons.

The choice of whether to represent a person to be physically within the workspace of a place object or external to a place object depend upon the function of a person with respect to a place object. Accordingly, a person who provides services within the place object is accurately depicted by representing the person within the place object. For instance, a librarian is typically thought of performing various services for the public within a library. Thus, the librarian can be depicted to be within the library. In contrast, the visitors to the library can be depicted within a separate window.

Since a large number of persons may exist within a given place object, a preferred embodiment provides representations of a group of persons scaled within a the place object. When there are a large number of persons in a place object, individual communication becomes less likely. Thus, all persons in the place object can be collapsed and represented as a single group. Accordingly, all persons belonging to the group can be communicated with simultaneously by sending messages. The ability to communicate with all persons of the group are subject to access control.

In the event that all persons are not desired to be collapsed into a group, a large number of persons can be partitioned. That is, only a segment of all the persons are represented and instantly accessible. Partitioning can be arbitrarily determined. For example, those persons located closest to a user can be separately grouped.

Regardless of whether a large number of persons are represented by collapsing them into a group or partitioning some members of the group, a preferred embodiment provides various location tools whereby a user may search through the large numbers of persons and identify a particular person.

DETAILED LOGIC

The following section sets forth the detailed logic of a preferred embodiment in accordance with the invention.

Figure 7:
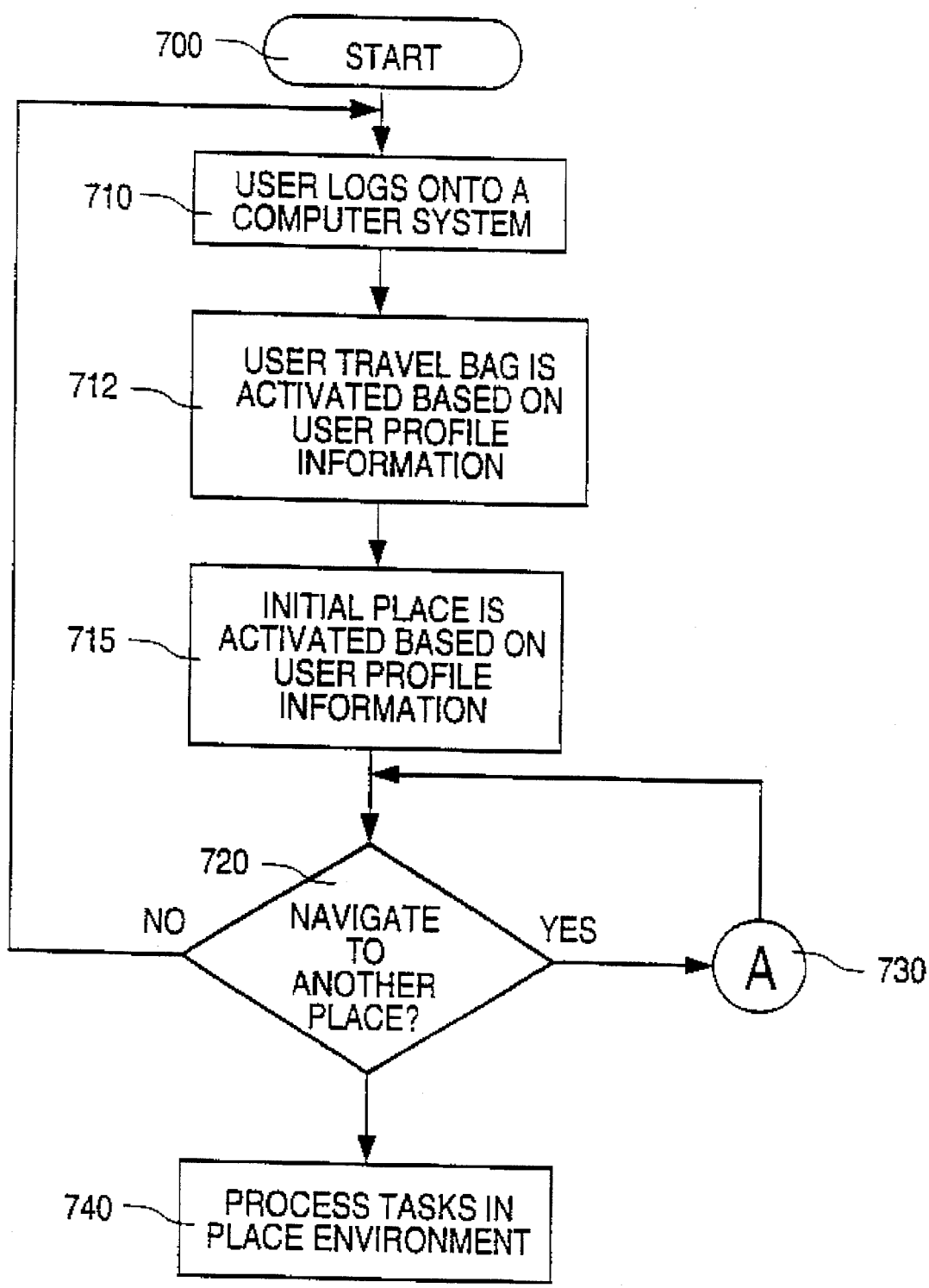
FIG. 7 is a flowchart showing the high level flow of control in accordance with a preferred embodiment.

FIG. 7 is a flowchart setting forth the high level flow of control in accordance with a preferred embodiment. Processing commences at terminal 700 and immediately passes to function block 710 where a user logs on, function block 712 illustrates the activation of the associated travel bag based on profile information stored in the place object, and in function block 715 the initial place object is activated based on user profile information. Then, at decision block 720, a test is performed to determine if a user desires to navigate to another place. If so, then control is passed via label 730 to FIG. 9, label 900 to process the navigation to a new place. Then, when control is returned, processing re-commences at decision block 720. If not, then in function block 740, the tasks in the current place environment are processed and control is passed back to function block 710 to await another user log on.

Figure 8:
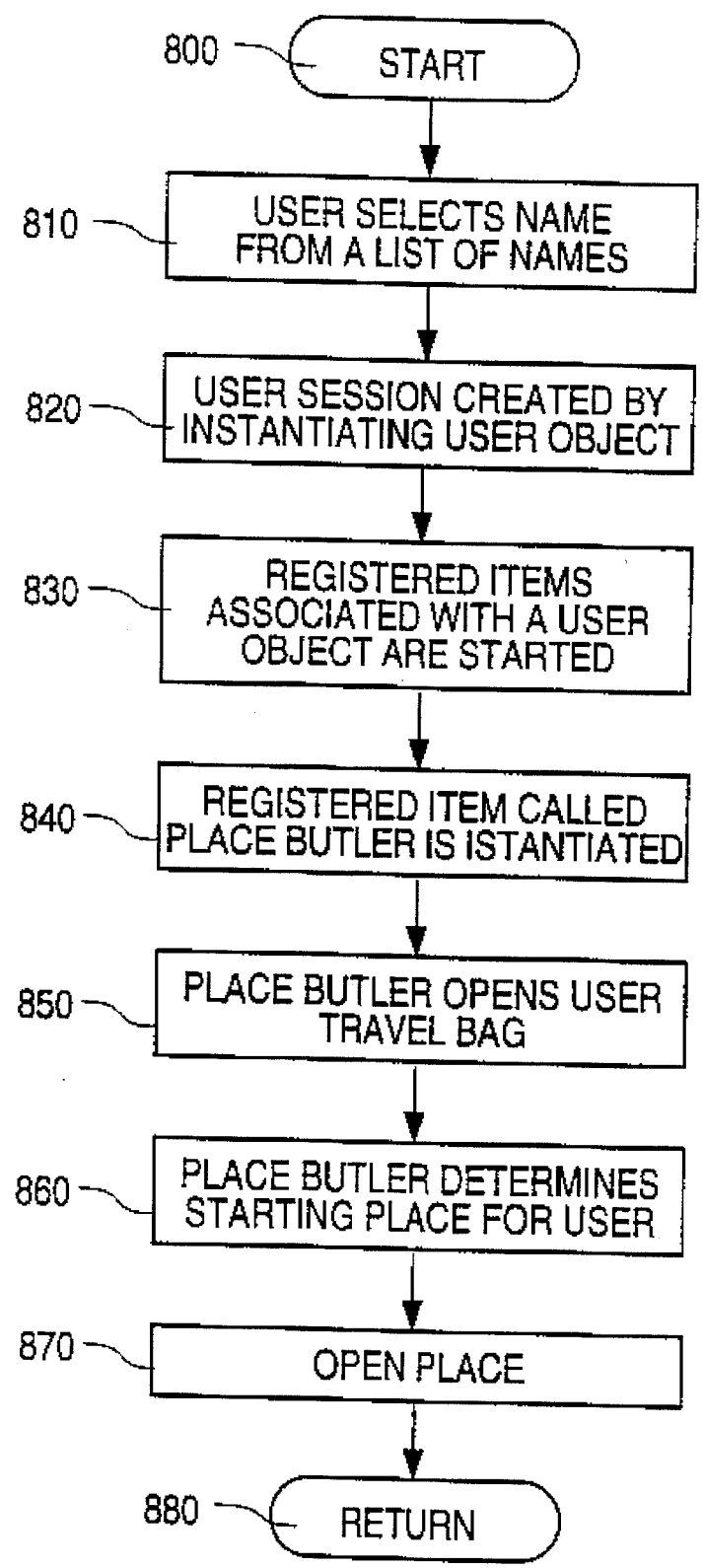
FIG. 8 is a flowchart showing the detailed logic in accordance with a preferred embodiment.

FIG. 8 is a flowchart setting forth the detailed logic of user session processing in accordance with a preferred embodiment. Processing commences at terminal 800 and immediately passes to function block 810 where a user selects a name for a list of names. Then, at function block 820, a user session is created by instantiating a user object. Then, function block 830 starts registered items associated with a user object, function block 840 instantiates the registered item called place Butler, function block 850 opens the user travel bag associated with place Butler, function block 860 determines the starting place for user place Butler, function block 870 opens place and terminal 880 returns control to the calling program.

Figure 9:
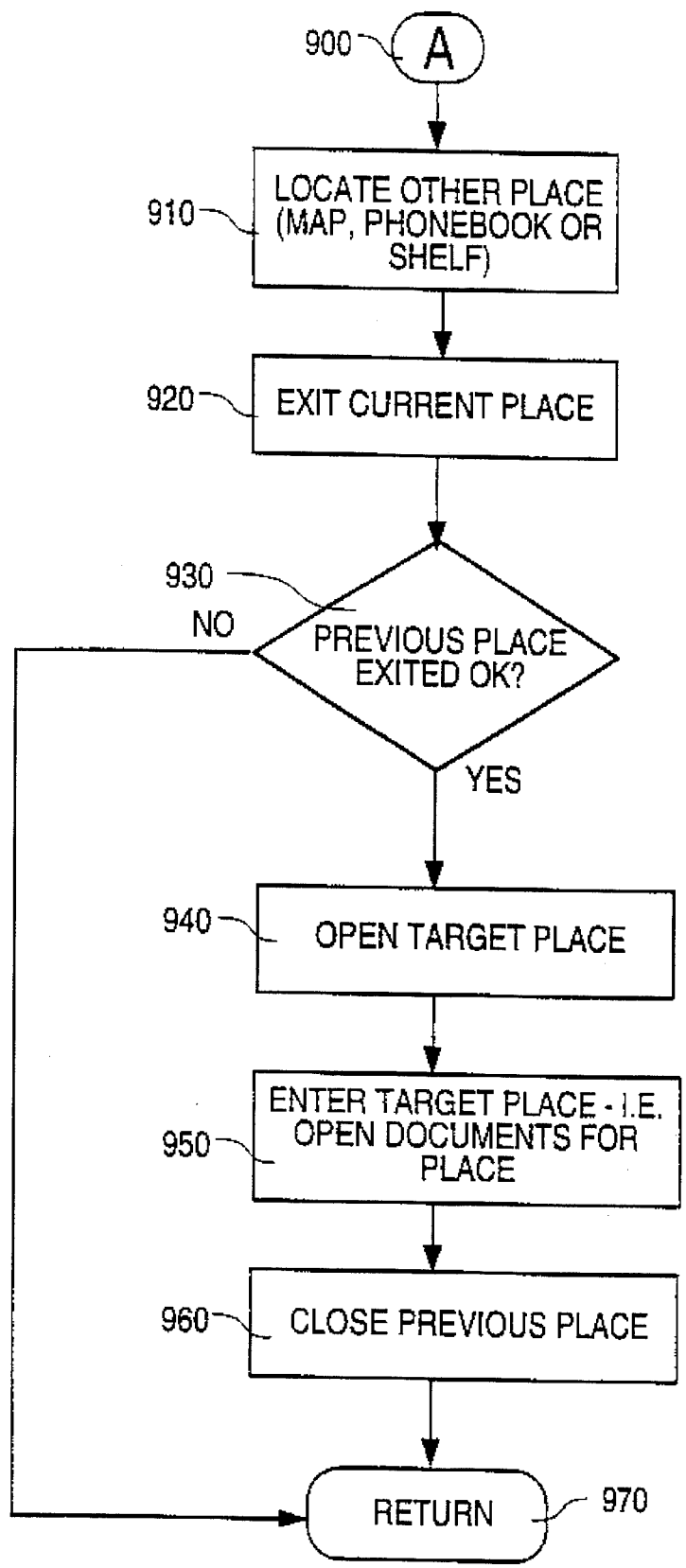
FIG. 9 is a flowchart showing the detailed logic in accordance with a preferred embodiment.

FIG. 9 is a flowchart setting forth the detailed logic associated with closing an old place and opening a new place in accordance with a preferred embodiment. Processing commences at terminal 900 and immediately flows to function block 910 to locate the other place, exit the current place as set forth in function block 920, and perform a test in decision block 930 to determine if the previous place exited ok. If the previous place exited in an appropriate manner, then the target place is opened in function block 940, the user is prompted to enter the target place in function block 950, the previous place is closed in function block 960, and control is passed back to the calling application in terminal 970. If the previous place does not exit appropriately in decision block 930, then control is returned via terminal 970 to the calling application.

Figure 10:
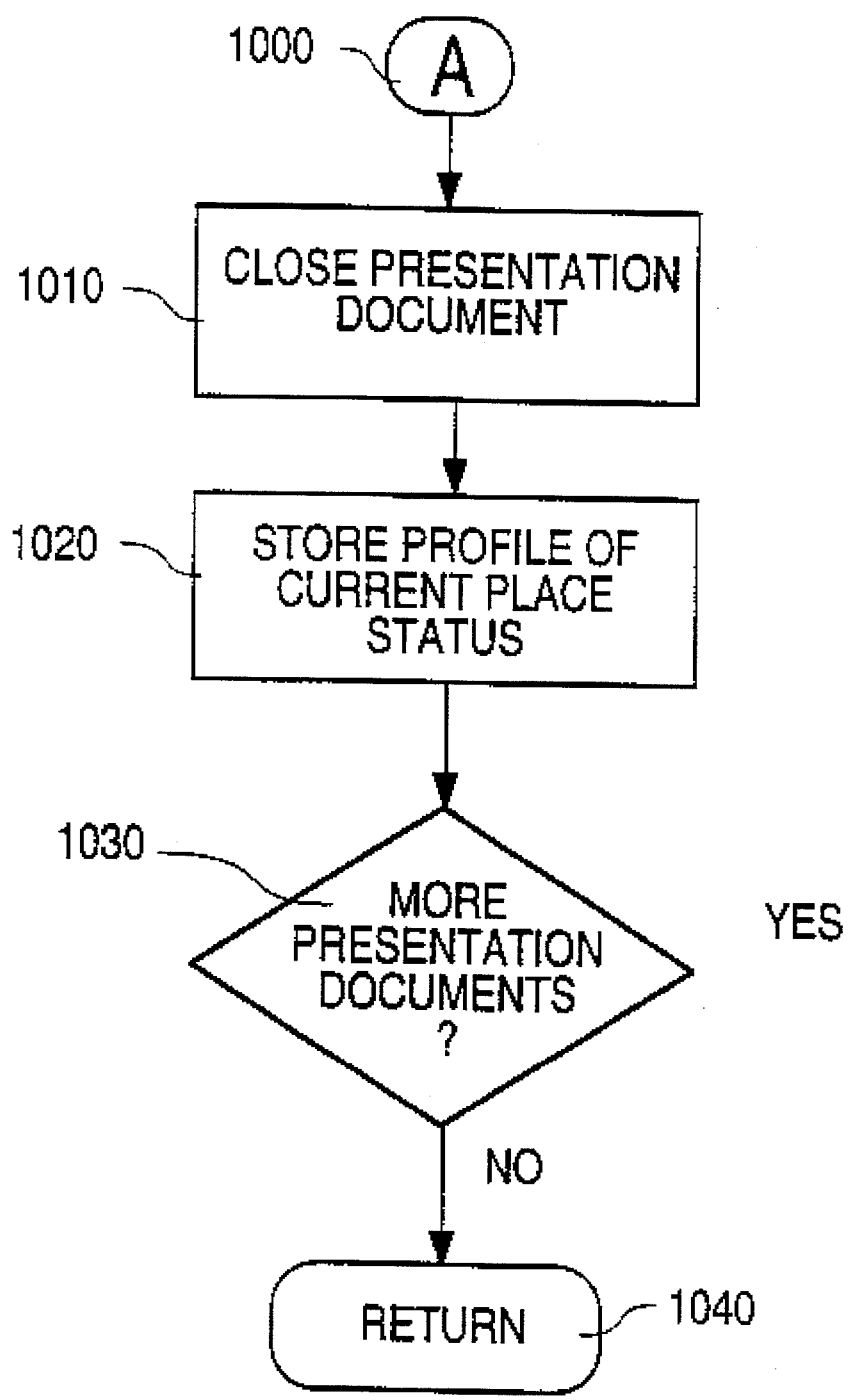
FIG. 10 is a flowchart showing the detailed logic in accordance with a preferred embodiment.

FIG. 10 is a flowchart setting forth the detailed logic associated with closing a place in accordance with a preferred embodiment. Processing commences at terminal 1000 and immediately passes to function block 1010 to close the presentation documents associated with the old place, a profile of current place status information is then stored at function block 1020 and a test is performed at decision block 1030 to determine if additional presentation documents are available. If so, then control passes to function block 1010 to process the additional documents. If not, then control is returned to the calling routine via terminal 1040.

Figure 11:
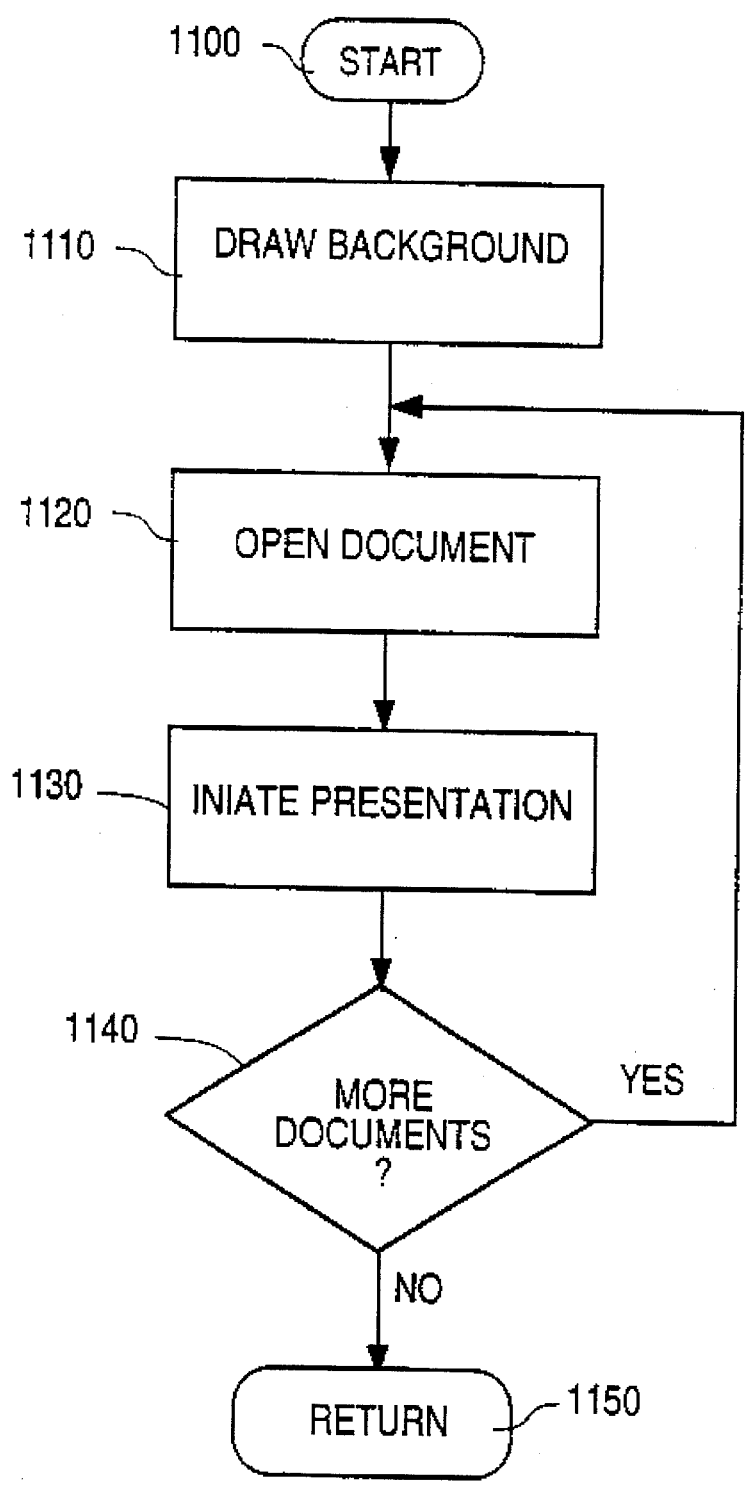
FIG. 11 is a flowchart showing the detailed logic in accordance with a preferred embodiment.

FIG. 11 is a flowchart setting forth the detailed logic associated with opening a new place in accordance with a preferred embodiment. Processing commences at terminal 1100 and immediately passes to function block 1110 to draw the background associated with a place. Then, at function block 1120, the documents associated with a place are opened, and the presentation associated with the documents is initiated in function block 1130. Then, a test is performed at decision block 1140 to determine if more documents remain to be processed. If so, then control passes back to function block 1120 to process the remaining documents. If not, then processing is terminated at terminal 1150.

Architecture

Figure 12:
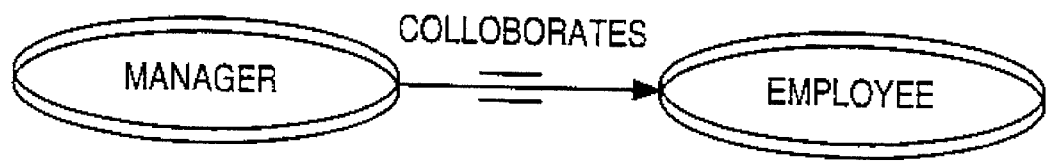
FIG. 12 is a Visual Design Language (VDL) key setting forth terminology used in other VDL illustrations in accordance with a preferred embodiment of the invention.
Figure 12:
Figure 12:
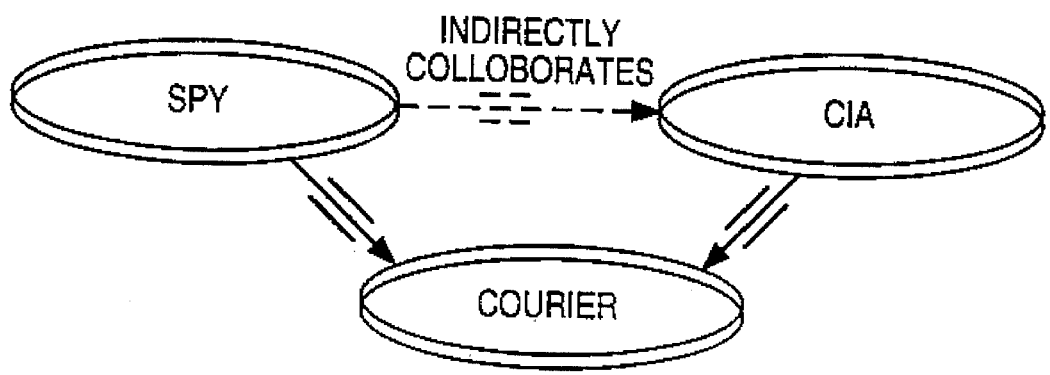
Figure 12:
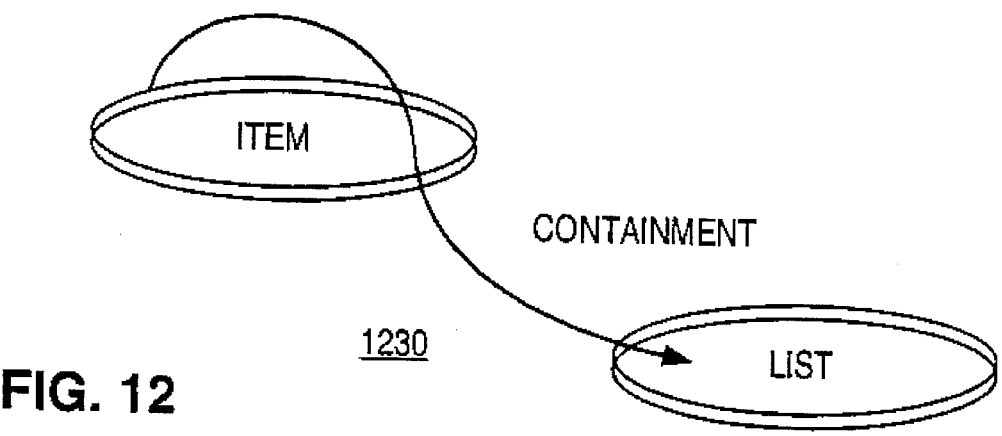
Figure 13:
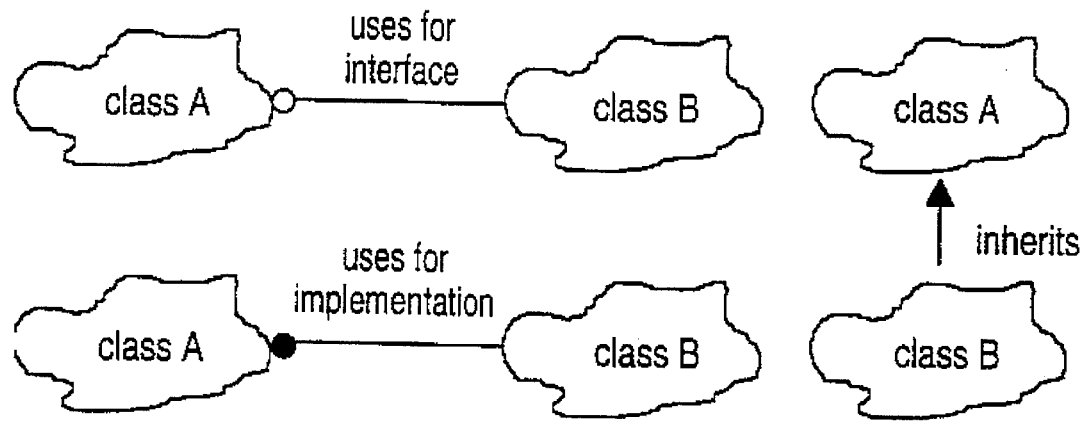
FIG. 13 is a Booch Diagram in accordance with a preferred embodiment of the invention.

The architecture setting forth the detailed logic is presented below. The logic is presented using tools such as class and object diagrams to present interactions within the system. FIG. 12 is a Visual Design Language (VDL) key setting forth terminology used in other VDL illustrations in accordance with a preferred embodiment of the preferred embodiment. Label 1200 shows an example of collaboration. Label 1210 shows an example of creation of an object. Label 1220 shows an example of indirect corroboration. Finally, label 1230 shows an example of containment. FIG. 13 is a Booch Diagram in accordance with a preferred embodiment.

Figure 14:
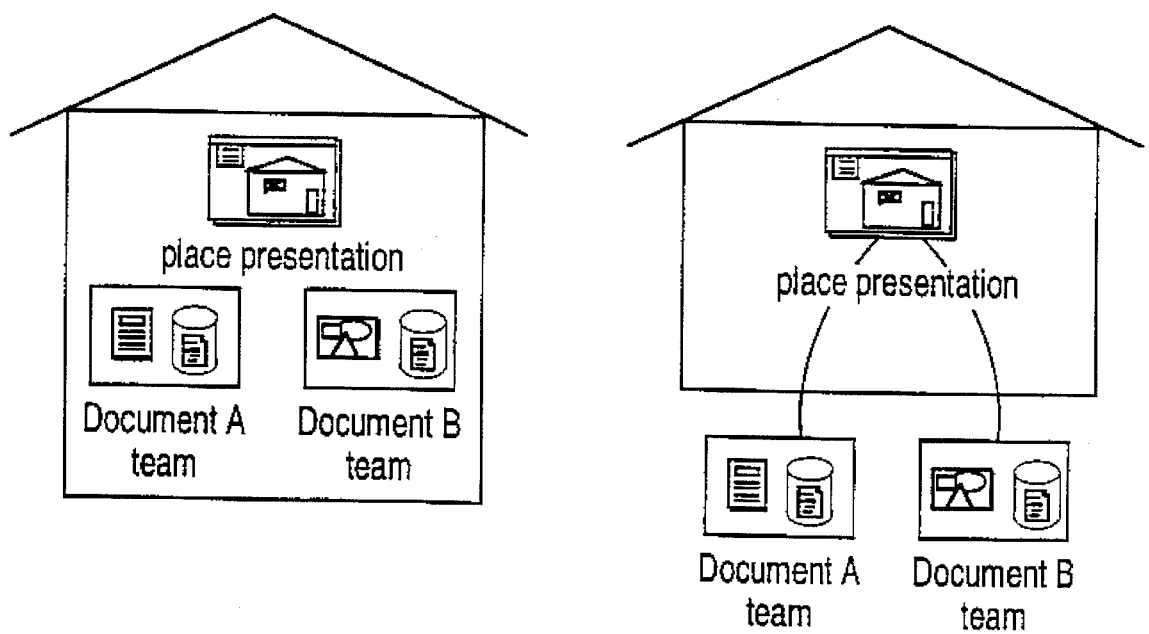
FIG. 14 illustrates the presentation of separate environments in accordance with a preferred embodiment of the invention.

Logically, a place is a self-contained environment which can be manipulated atomically. Unfortunately, the content which is running in a place is logically associated but is not grouped by any lower level services. Put differently, a place is a logical grouping of items which run in separate address spaces and are treated individually by operating system frameworks such as the layer server, view system or document architecture. In order to function as a logical unit, the higher level of place services must manage the items of a place to present a user with a conceptual model of separate environments as illustrated in FIG. 14. Each user has some set of places on a machine for which they are the owner. Each user may also have access rights to be able to enter other places.

Ownership Hierarchy Of Places

Figure 15:
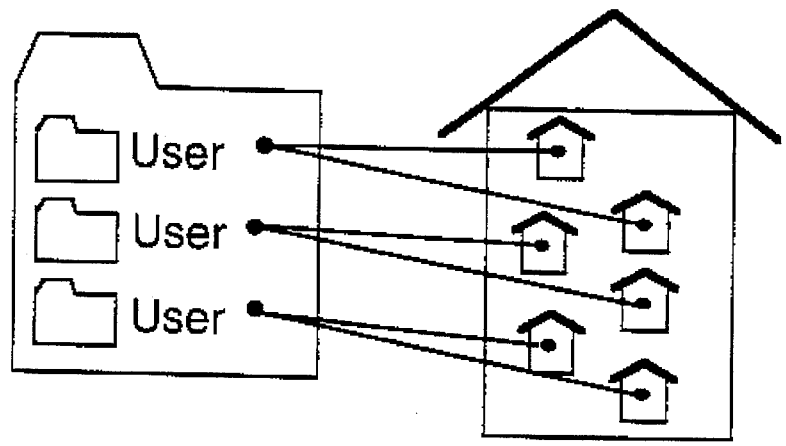
FIG. 15 illustrates a given machine having a single "home" place where they can store their documents and workspace items in accordance with a preferred embodiment.

Each user on a given machine will have a single "home" place where they can store their documents and workspace items as depicted in FIG. 15. Since sharing of individual machines is allowed, there can be many home places on a system, and there is a simple way to configure the system to have a guest or public place which other people who are not known to a system can use. A simple hierarchy of places is illustrated in FIG. 4 which illustrates a logical hierarchy of places among users of a shared machine. Each person has their own "home" place which contains their particular information and which is further divided up into subplaces for different uses.

Users are Always in a Place

Figure 16:
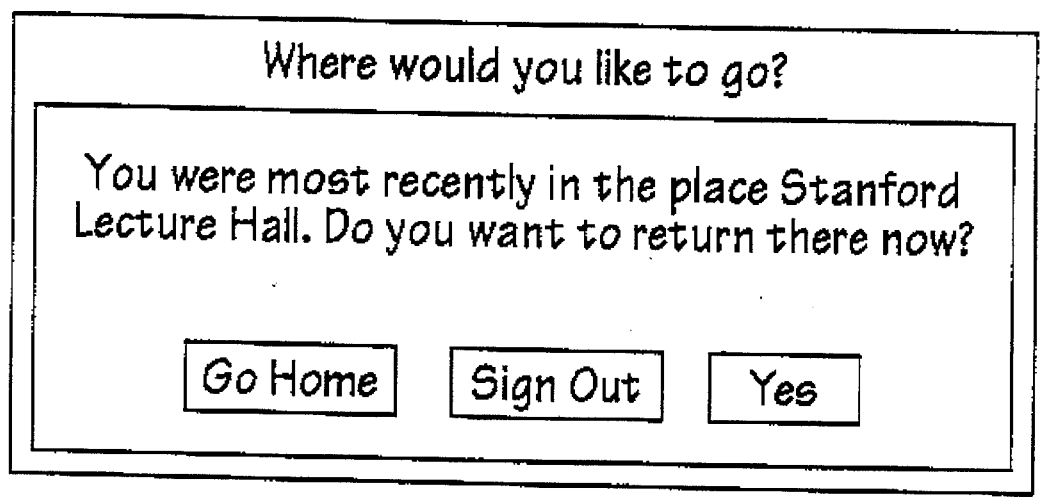
FIG. 16 illustrates some example dialogs which give choices of home or default place, the last place they were in before logging off, or a place of their choosing in accordance with a preferred embodiment.

Users always exist in a place. Users are never void, so when they log in, they must be positioned in an appropriate place. That could be their home or default place, the last place they were in before logging off, or a place of their choosing. FIG. 16 illustrates some example dialogs which give just these choices.

Users have the option of specifying which place to go to after log-in. They choose from one of the following possibilities: 1) absolute: go to a specific place such as the Home or the Mail place, or 2) the most recent place (i.e. where the user was immediately before they logged out). If the most recent place is a remote place, the system may ask if the user wants to go there now. The user might see a dialog box similar to the dialog box illustrated in FIG. 16.

Each user has a place designated as the default place. The default place is just a reference to the place which the user wants to commence operations with when the user logs in. The default place is also the place a user can return to when necessary. We can make this more readily available by some shortcut such as a command key or by access through the shelf. By default, the user's home place is their default place.

Places Maintain User-Specific Information

Many aspects of the design for places allow for user customization and history. For example, each user may have their own view of a place and their own saved presentations of documents. This information must be stored somewhere, and since it is user-specific information, it is stored in the user area provided by the people subsystem. User-session subsystem start up place elements. The places design requires certain interface elements to be opened when the user session begins. An example of such an object is the shelf or travel bag. The places framework requires certain processes, such as the history service, to be running. The creation of a user session starts these services.

Places Can Show Which People are in Them

Figure 17:
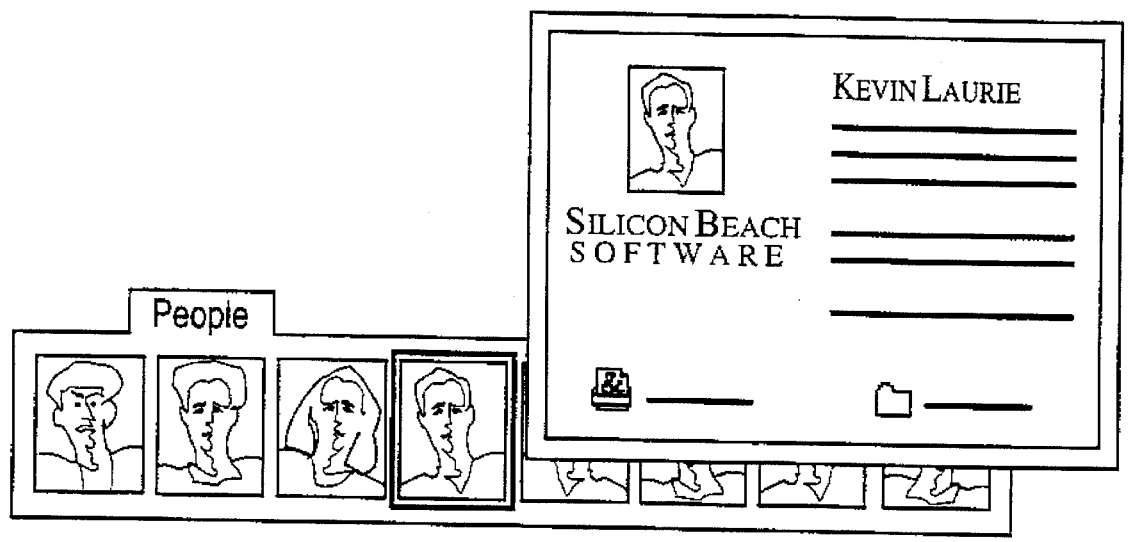
FIG. 17 illustrates a people strip which shows the people in a place in accordance with a preferred embodiment.

FIG. 17 illustrates a people strip which shows the people in a place. From the icons for the people in the place, a business card for that person can be automatically dragged. The TPlace model class maintains a set of TPerson objects which are currently connected to the place. As people enter the place, person objects are instantiated for them and added to the place model. When they leave the place, the place removes its references to people.

Figure 18:
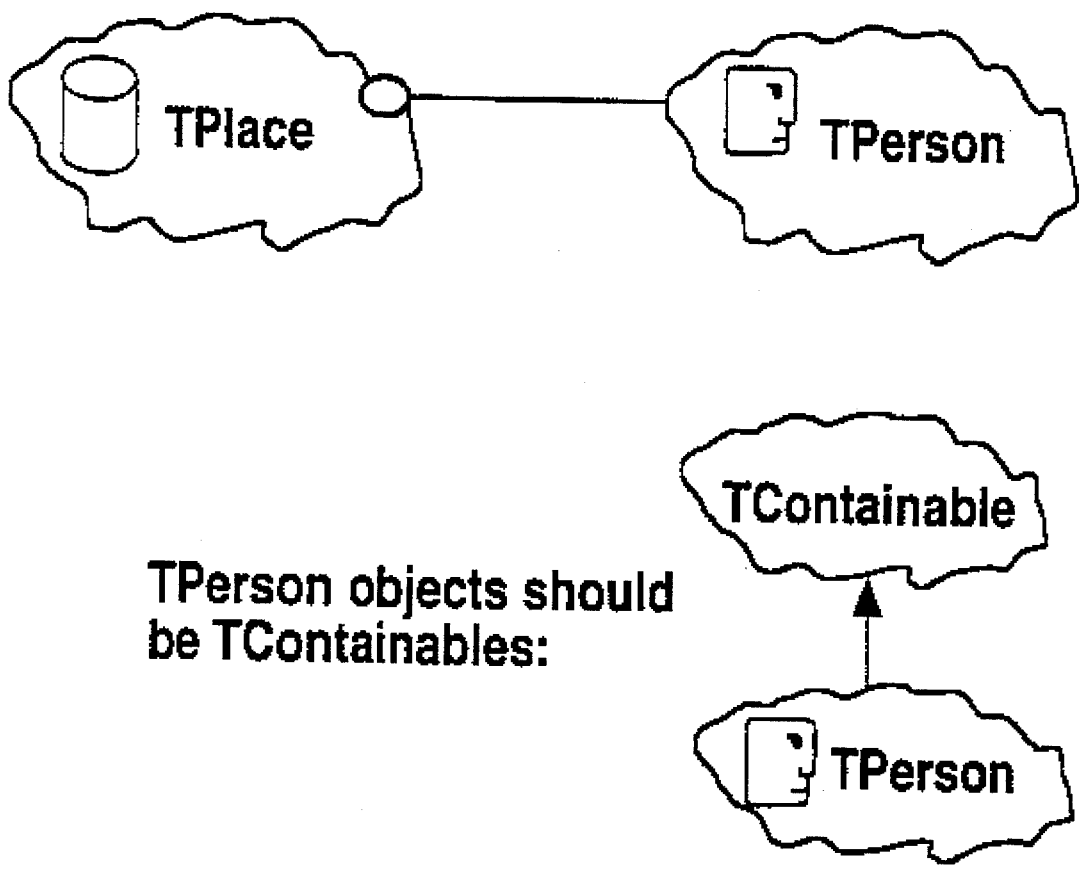
FIG. 18 illustrates the methods of a model which relates to Person presence management in accordance with a preferred embodiment.

Below are the methods of the TPlace model which relate to Person presence management. Their interaction is illustrated in FIG. 18.

```
class TPlaceModel : public TFolderModel
{
public:
    //... other stuff removed...
    virtual void        AdoptConnectedPerson( TPerson* );
    virtual void        AddConnectedPerson( const TPerson&);
    virtual void        RemoveConnectedPerson( const TPerson& person );
    virtual TPerson*    OrphanConnectedPerson( const TPerson& person );
    virtual TIterator*  CreateConnectedPeopleIteratoro const;
    virtual Boolean     IsConnected( const TPerson& person );
    // Some speculative ideas
    virtual Boolean     AllowPersonToEnter( TPerson& person );
    // virtual void     PersonEntered( TPerson& person );
    virtual TInterest*  CreateAddedPersonInterest();
    virtual TInterest*  CreateRemovedPersonInterest();
}
```

Places and User Preferences

Figure 19:
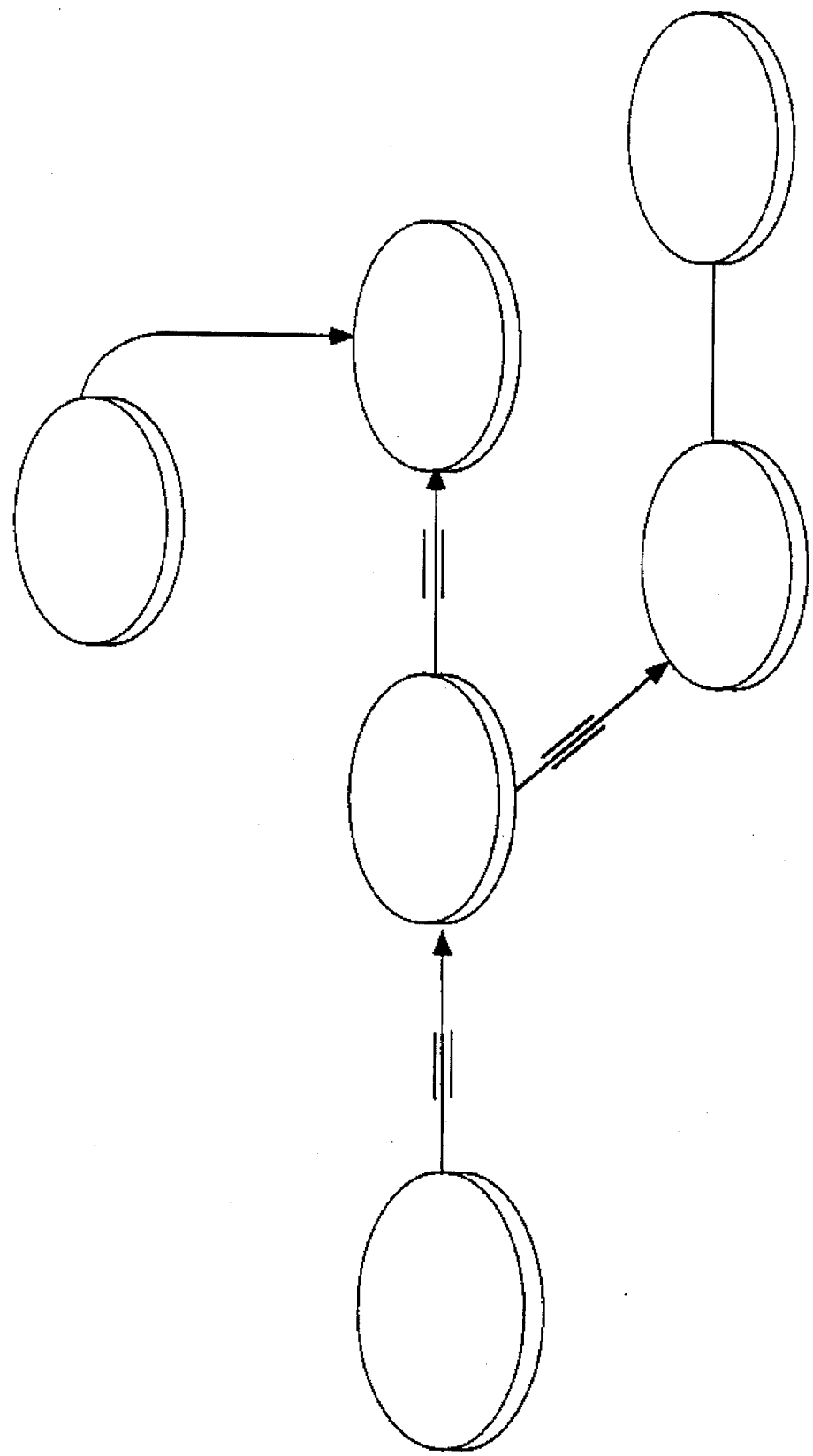
FIG. 19 illustrates the process by which a person object gets added to a place model in accordance with a preferred embodiment.

The process by which a person object gets added to a place model is illustrated in FIG. 19 and discussed below. Taken to its logical extreme, the implications of a place as a virtual machine would seem to indicate that each place would have its own set of preferences associated with it and that all user preferences would also be specific to places. Doing this provides a high degree of flexibility to the user in terms of allowing almost completely different user environments (to the extent that environments can be customized using preferences), but does so at the expense of simplicity and in doing so requires much more sophistication in terms of interfaces which should be presented on top of preferences.

Allowing preferences which are place specific is complex because of the number of possible intentions the user might have when specifying them:

use this preference only when in this place.

make this the default preference for all places not having a specific preference of this type.

make this the current preference of this type always. This preference is the overriding value. If default and place-specific preferences are the only parameters provided, users may become confused and provide an invalid default and expect it to apply everywhere. A place could be entered having no place-specific preference of that type.

Figure 20:
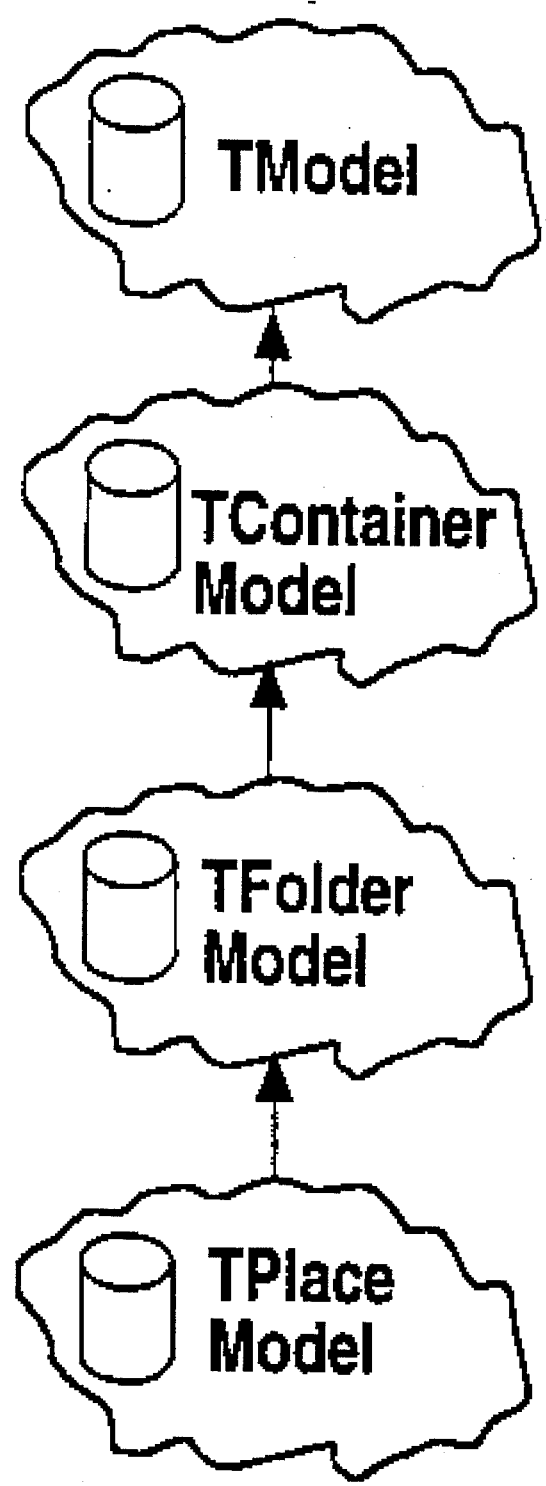
FIGS. 20 and 21 illustrate the relationship between places and the workplace in accordance with a preferred embodiment.
Figure 21:
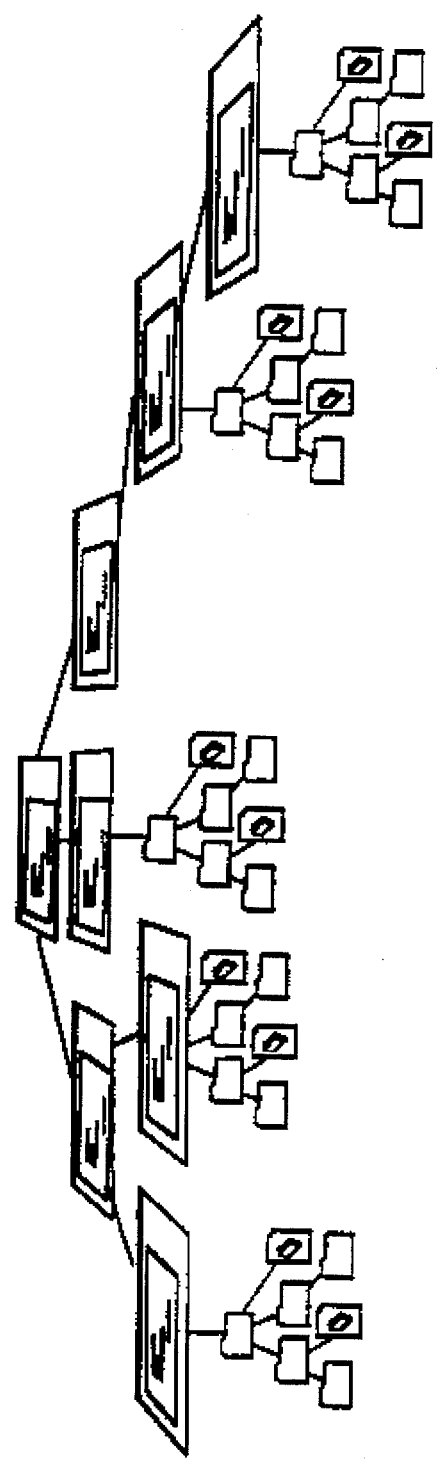

The relationship between places and the workspace is set forth in FIGS. 20 and 21. Places are the highest level entity of the workspace and serve as the context for the usage of the other elements of the workspace. Places can contain other places and can contain other workspace elements, such as folders and documents. Essentially providing a partitioning of user information space into more meaningful logical groupings, such as by project, by task, by corporate organization, etc. Within a place, there exist a containment hierarchy of folders and documents as pictured below.

Maintaining A Persistent Document State

One of the functions which a place presentation must support is the ability to restore state to that which existed the last time the user was in the place. Both places and presentations on places reference documents which they logically have open within them.

keep track of the set of documents open within the place.

open these documents when the user enters a place.

close these documents when the user leaves a place.

for all of the above, the place presentation needs to be able to save the specific presentation which was open in the place in order to present the environment in a realistic state. For example, if a calendar document supports multiple presentations, the monthly view should be in one place and the day view in another. A container in list view is appropriated in one place and in a spatial view in another. Both places and place presentations must maintain information about which documents are open within the place.

User-Specific Presentations Stored With User

Figure 22:
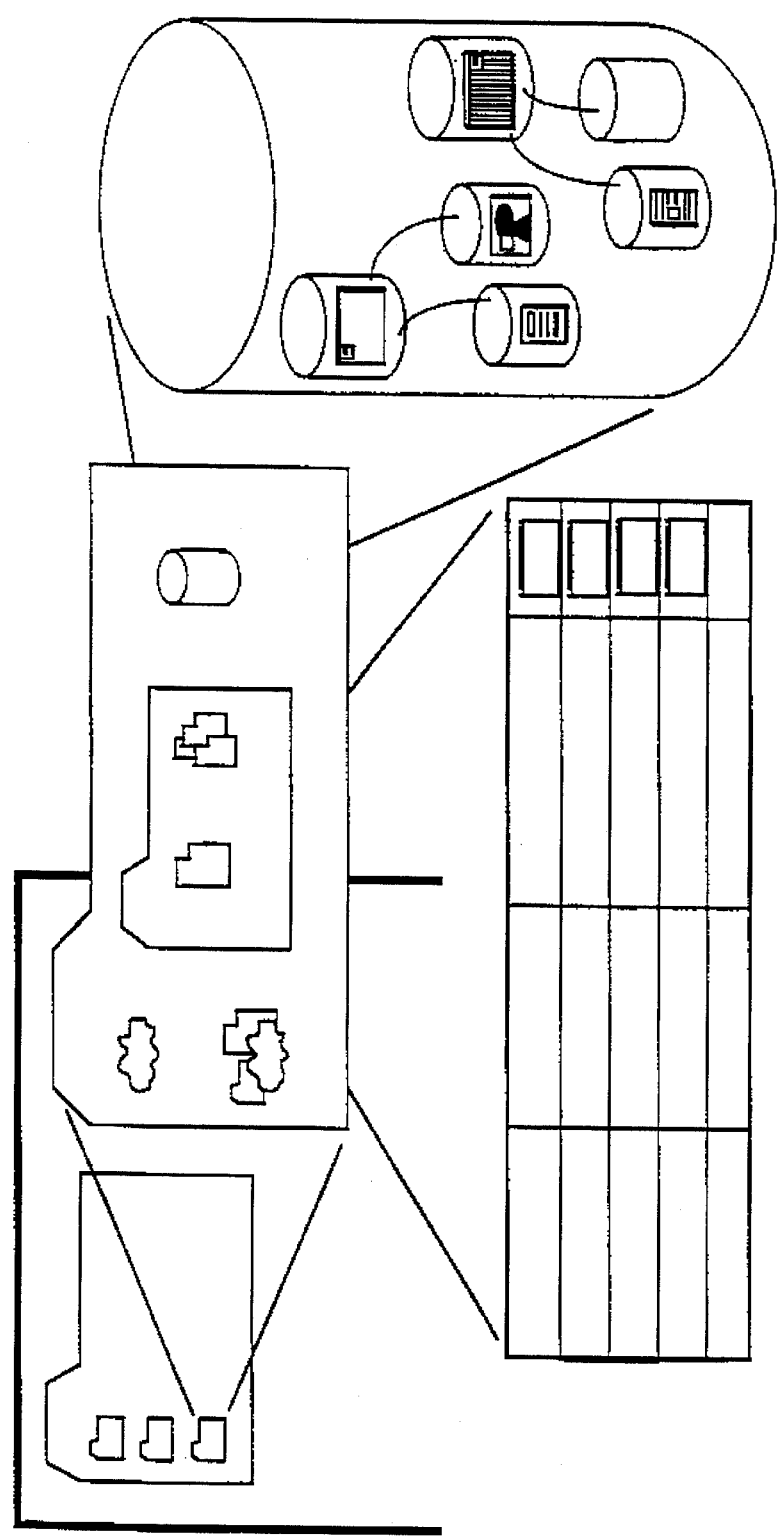
FIG. 22 shows the objects which are stored with the user information in order to maintain the document presentation state in accordance with a preferred embodiment.

FIG. 22 shows the objects which are stored with the user information in order to maintain document presentation state. The large model store shows that both saved presentations on places and presentations on user documents exist here. The catalog shows the mapping of document to specific presentations for places. These are used when users open documents so that the correct presentation can be used. Within the user's space, the people subsystem provides storage for preference information and recent history information. The presentations themselves are stored here as well as a catalog which references them. The catalog uses the dictionary semantics which user preference MPreferenceCollection objects provide.

Each person has a single presentation on a place, such that it contains all the information necessary to present that place to the user as it was last seen. This includes the list of open documents within the place (represented as presentation surrogates and possibly with data model IDs as well).

Each person can have multiple presentations saved on a single document. She can have a different presentation for each place in which it is seen.

A catalog of document presentation information maps documents to existing saved presentations which exist for the places in which they were seen. The information in this catalog is document (which needs only model ID (a global ID) as a key, place ID, and the presentation surrogate for the presentation.

Figure 23:
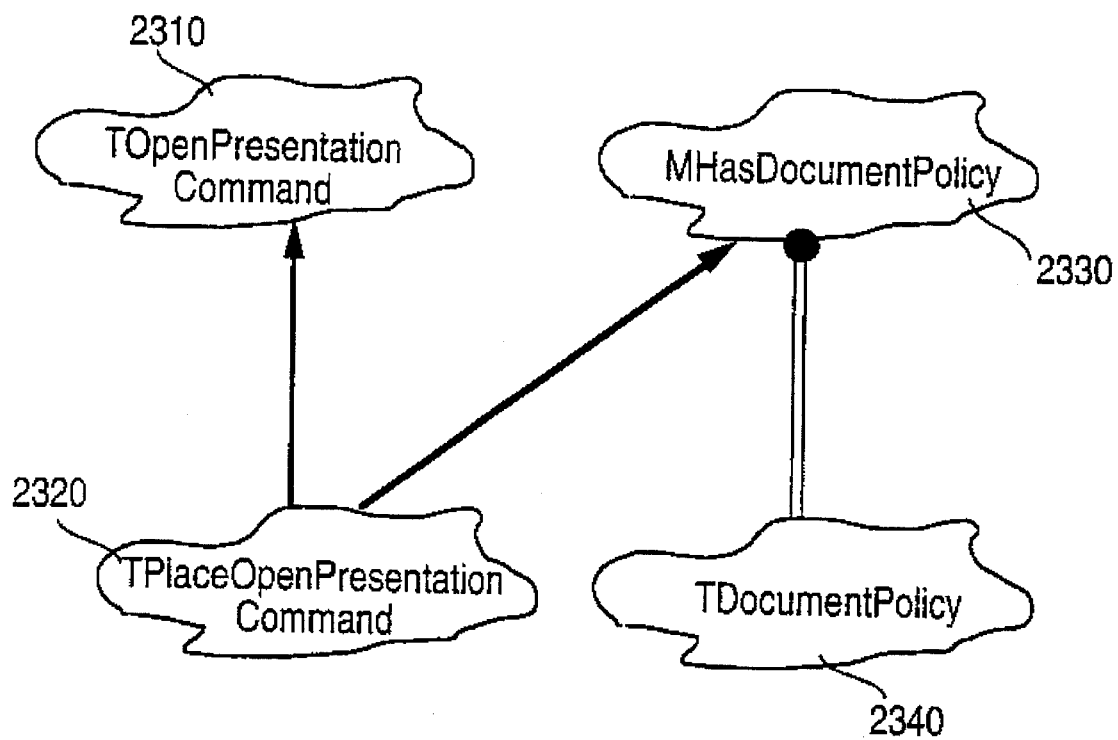
FIG. 23 is a Booch diagram illustrating command subclasses which employ place document policy objects in accordance with a preferred embodiment.

Place presentations require information pertaining to documents including when a document was first opened in order to properly restore state the next time in the place. To do this, they need to receive notification of when window presentations get open in the place. This is accomplished through the following procedures:

all open/close/follow commands use a form of model command which delegates the work for opening and closing documents to a contained policy object. FIG. 23 is a Booch diagram illustrating command subclasses which employ place document policy objects in accordance with a preferred embodiment. Label 2310 identifies a model command for opening documents in accordance with a preferred embodiment. Label 2320 identifies a subclass of the model command of the command presented at 2310 which delegates to the place document policy object. Label 2330 is a mixin class which stores the document policy used by 2320 in memory. All place specific model commands subclass from the object at label 2330. Label 2340 is a policy object which performs the operation set forth in the preceding objects.

the policy object wraps up the type of behavior we want to happen for this place. The behavior is different for collaborative places or if a different human interface is desired.

when each container or document presentation registers its "open" command into the menu, it uses these delegating open commands, which have information in them as to how to contact the place for document registration. These presentations received the policy object themselves when they were opened, as you will soon see.

when the open command is executed, it will start up the document to be opened (that occurs when the command itself is passed to the document to be executed).

the open command will delegate the open to the policy object it contains.

the policy object determines the appropriate presentation to use by consulting the catalog of presentations saved for this user.

the policy object then opens that presentation and sets the policy object for that presentation to be the same as itself. This is how the policy object propagates to all presentations opened within the place. This solution works even when there are window places or multiple places open at once.

the policy object then registers the opening of the document with the place presentation.

the place presentation updates its list of open documents to add the new entry

Figure 24:
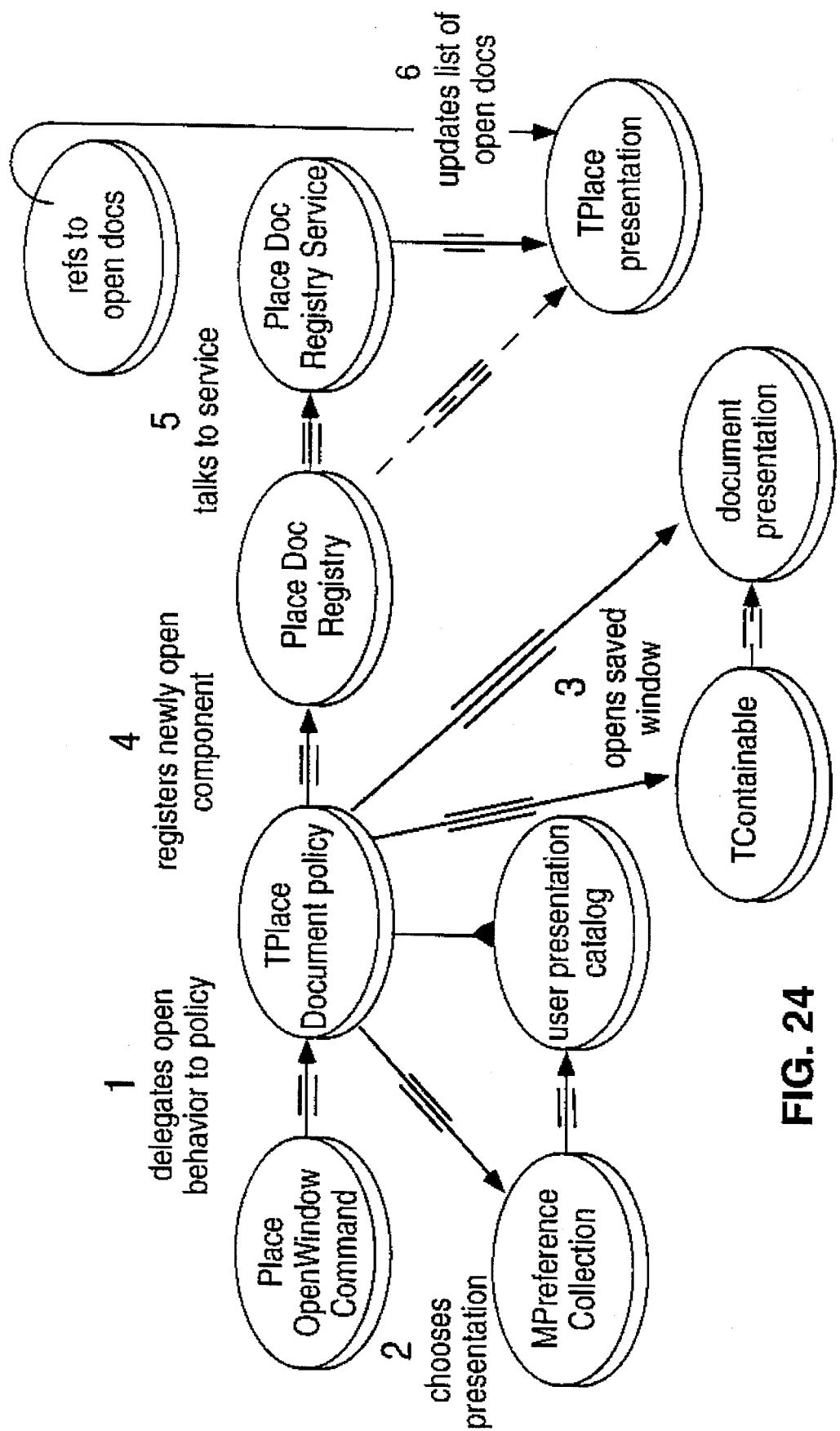
FIG. 24 illustrates the steps involved in opening a saved presentation on a document within a place in accordance with a preferred embodiment.
Figure 25:
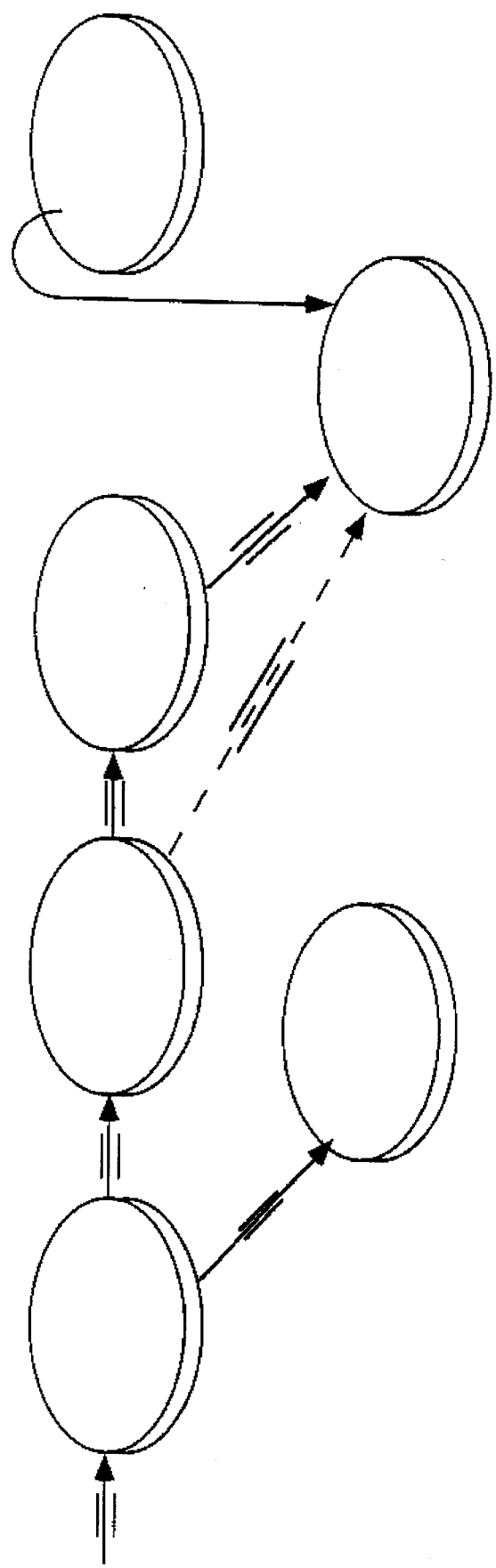
FIG. 25 illustrates the steps involved in closing a presentation on a document within a place in accordance with a preferred embodiment.

The steps involved in opening a saved presentation on a document within a place are illustrated in FIG. 24, and the steps involved in closing a presentation on a document within a place are illustrated in FIG. 25.

Container Model Architecture

When object A embeds object B, B's model is copied into A's model store. B is called an embedded model. B forms an embedment hierarchy with A. B's presentation appears as a frame/thumbnail inside A's presentation. B's thumbnail can be opened in-place in the same window and team, or out-of-place in a separate window but the same team. When object A contains object B, B's model is not copied into A's model store. B is called a containable. B forms a containment hierarchy with A. B's presentation appears as an icon inside A's presentation. B always open out-of-place (in separate window and team).

Figure 26:
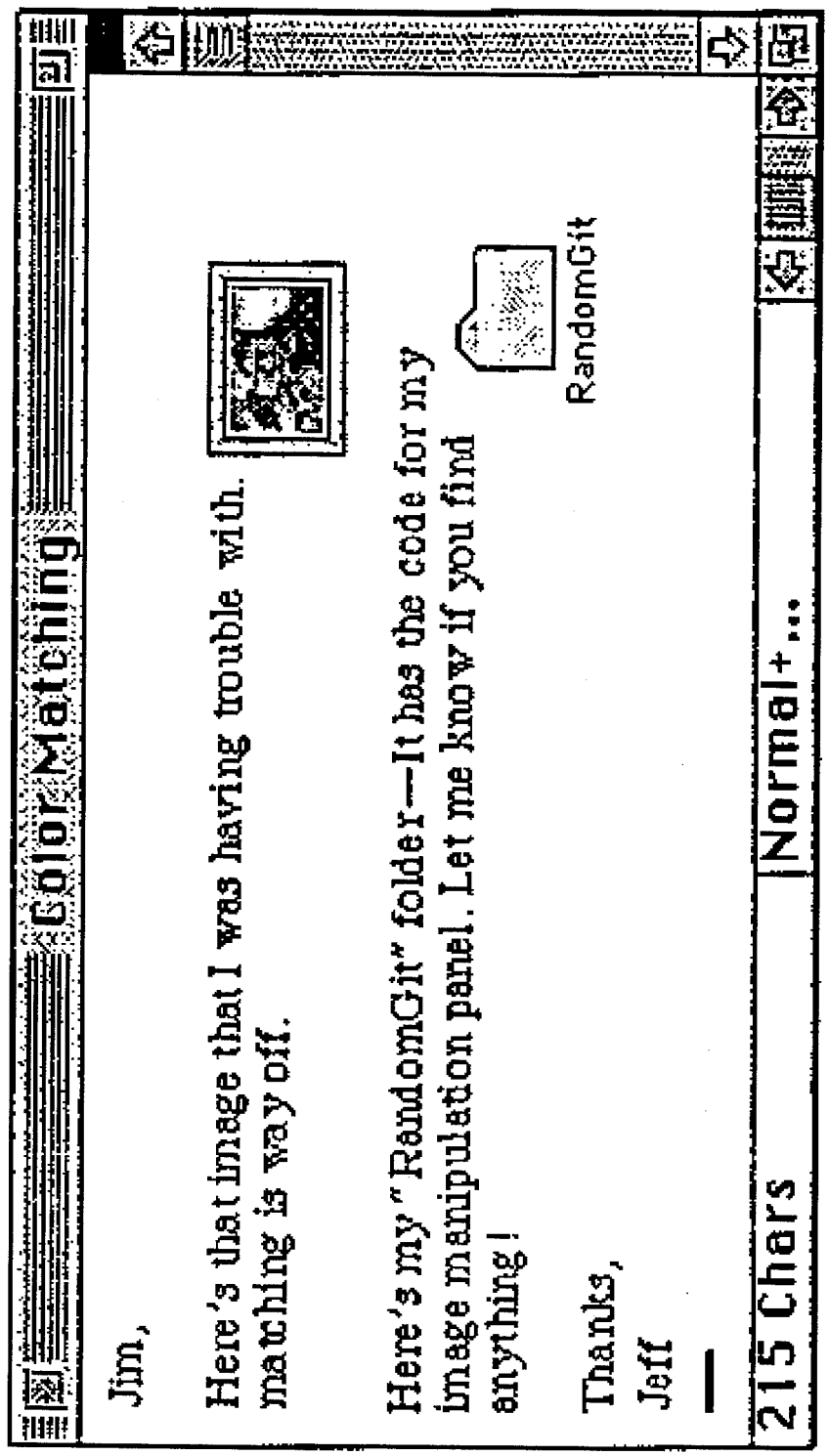
FIG. 26 illustrates the difference between embodiment and containment in accordance with a preferred embodiment.

FIG. 26, succinctly explains the difference between embedment and containment. In this message, a request is made concerning a color matching problem. An image is embedded into the document and reduced to encompass the whole message without scrolling past the image. It has a distinction "HEY I'M A FRAME" border. The image will by default open in-place. The folder holds Jeff's code for Jim to look over. It is contained in the message and will always open out-of-place.

Inherent Characteristics of a Container

A container has the following inherent characteristics:

It can contain objects. Whereas workspace containers (e.g., folders and places) only hold workspace objects (e.g., documents, folders), other special-purpose containers may hold other types of objects. For example, a database container can hold the result of a database query. Deleting an object from a container removes the object's model (in-memory structure) and model store (on-disk structure) from the system.

It can contain reference links to objects and provides the scope for fixing-up these links when the referred-to objects are copied from one container to another. Deleting a reference from a container only removes the reference, and does not affect the referred-to object's model and model store. Non-containers can also hold references to objects: containers and references are not tightly coupled.

It can form a containment hierarchy which is independent of file system hierarchy. In other words, users are free to organize the information in their workspace using containers, regardless of where or how the information is stored in the file system. A container can span multiple volumes. If all the volumes are not available then the unavailable objects are not shown or grayed out. The container itself, i.e., the root of the containment hierarchy, lives in its enclosing place and belongs to the same storage domain (network:machine:volume) as the place.

A smart container can use locators to filter its contents. Inherited characteristics of a container include:

User operations on a container (cut/copy/paste, drag/drop, selection, move, etc.) can be undone and redone an unlimited number of times.

A container can have a window/frame/thumbnail/icon presentation. There can be multiple presentations of the same container—each presentation with a distinct look and possibly feel (e.g., folder and rolodex).

Usage Scenarios

The following scenarios will use folders and documents to describe the user interaction with containers and containables. Other types of containers and containables will behave similarly.

Figure 27:
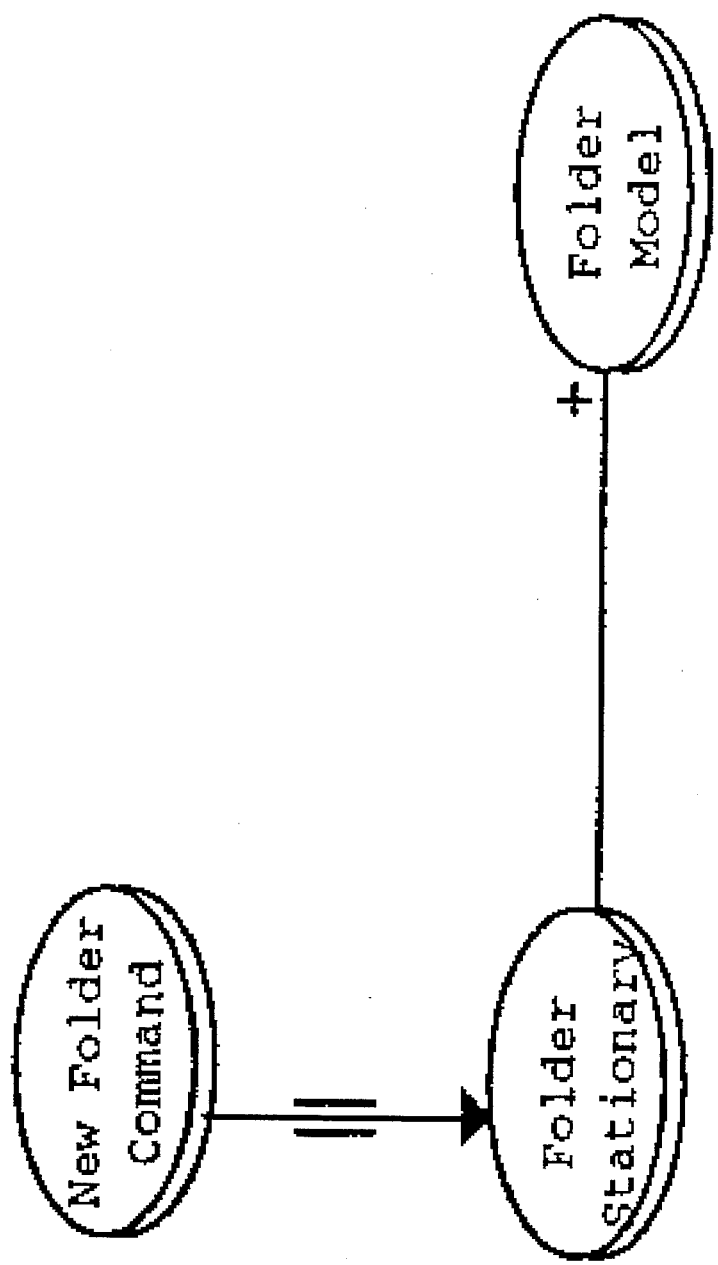
FIG. 27 is a VDL diagram illustrating the creation of a folder in accordance with a preferred embodiment.

Creating a folder. double-click on a folder stationery and a new folder is created on a shelf. There will be other types of stationary for creating other types of containers. A VDL diagram illustrating the creating a folder logic is presented in FIG. 27.

Figure 28:
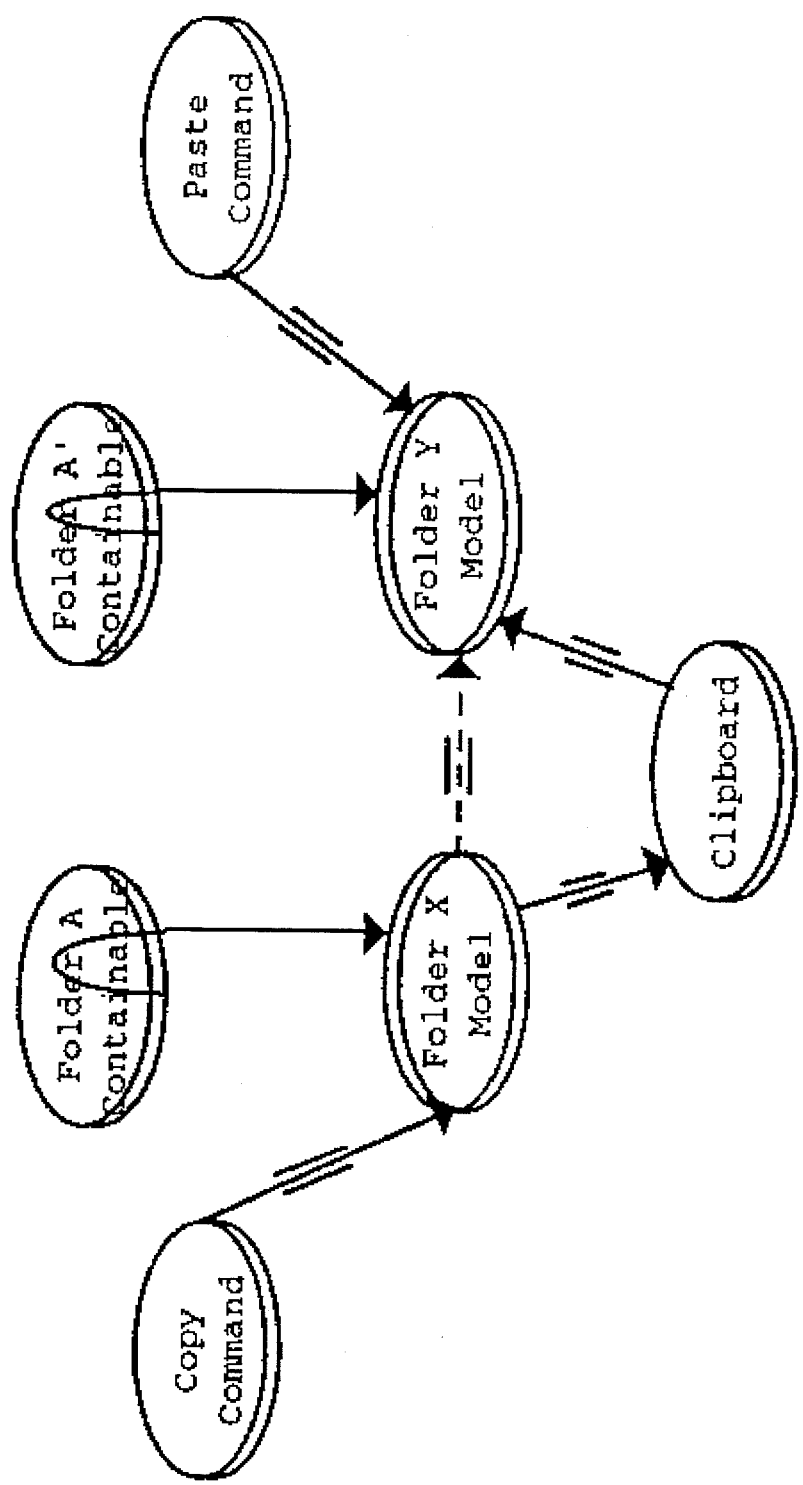
FIG. 28 is a VDL diagram illustrating the copying of a folder logic in accordance with a preferred embodiment.

Copying a folder from one folder to another folder. option-drag hold down the Option key while dragging Folder A from Folder X and drop it into Folder Y. Folder A' will contain copies of all the original documents. If these originals are linked, the copies will be linked to each other and not to the originals. A VDL diagram illustrating the copying a folder logic is presented in FIG. 28.

Figure 29:
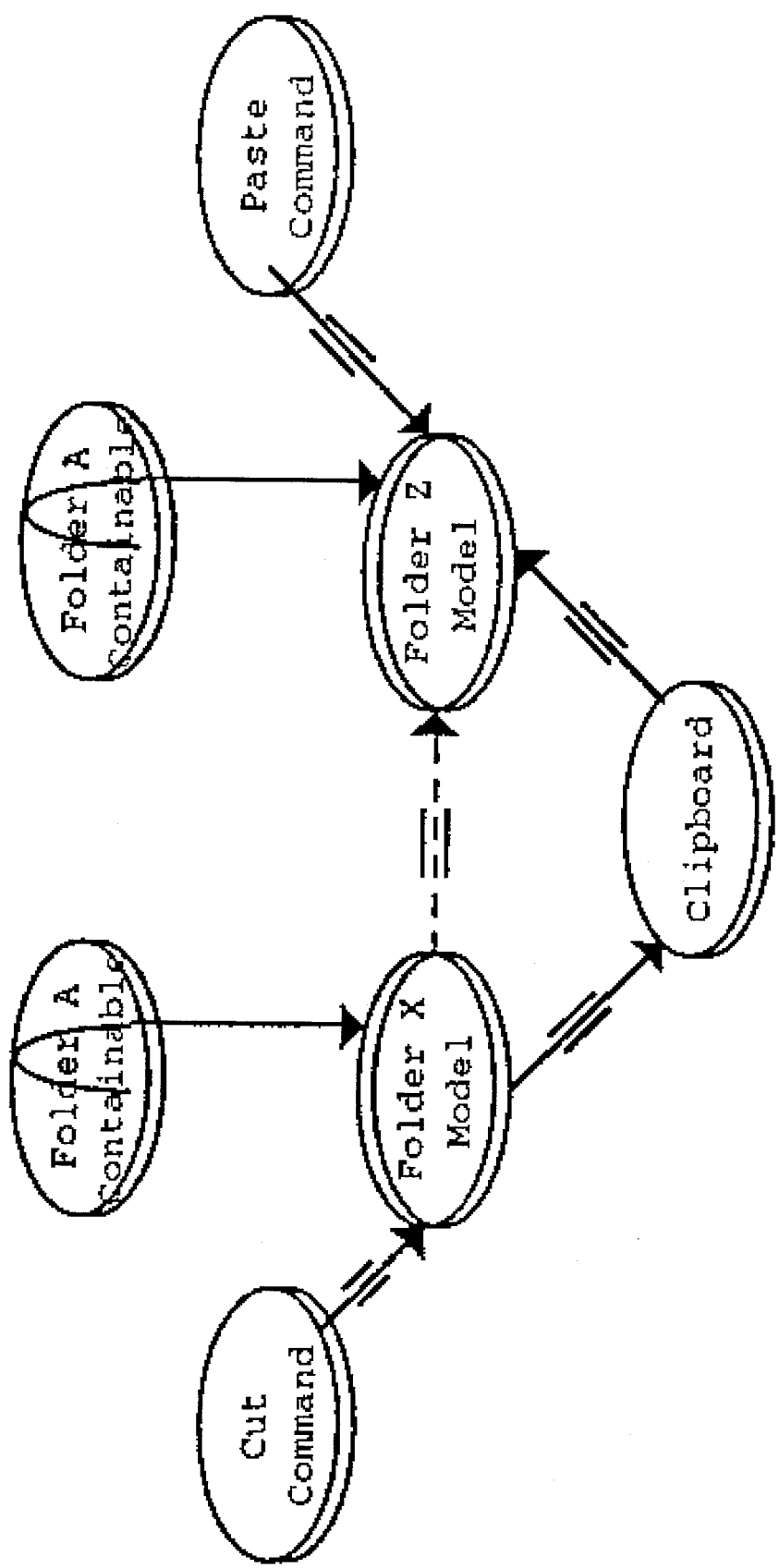
FIG. 29 is a VDL diagram illustrating the movement of a folder logic in accordance with a preferred embodiment.

Moving a folder from one folder to another folder. drag Folder A from Folder X and drop it into Folder Z. A VDL diagram illustrating the moving a folder logic is presented in FIG. 29.

Figure 30:
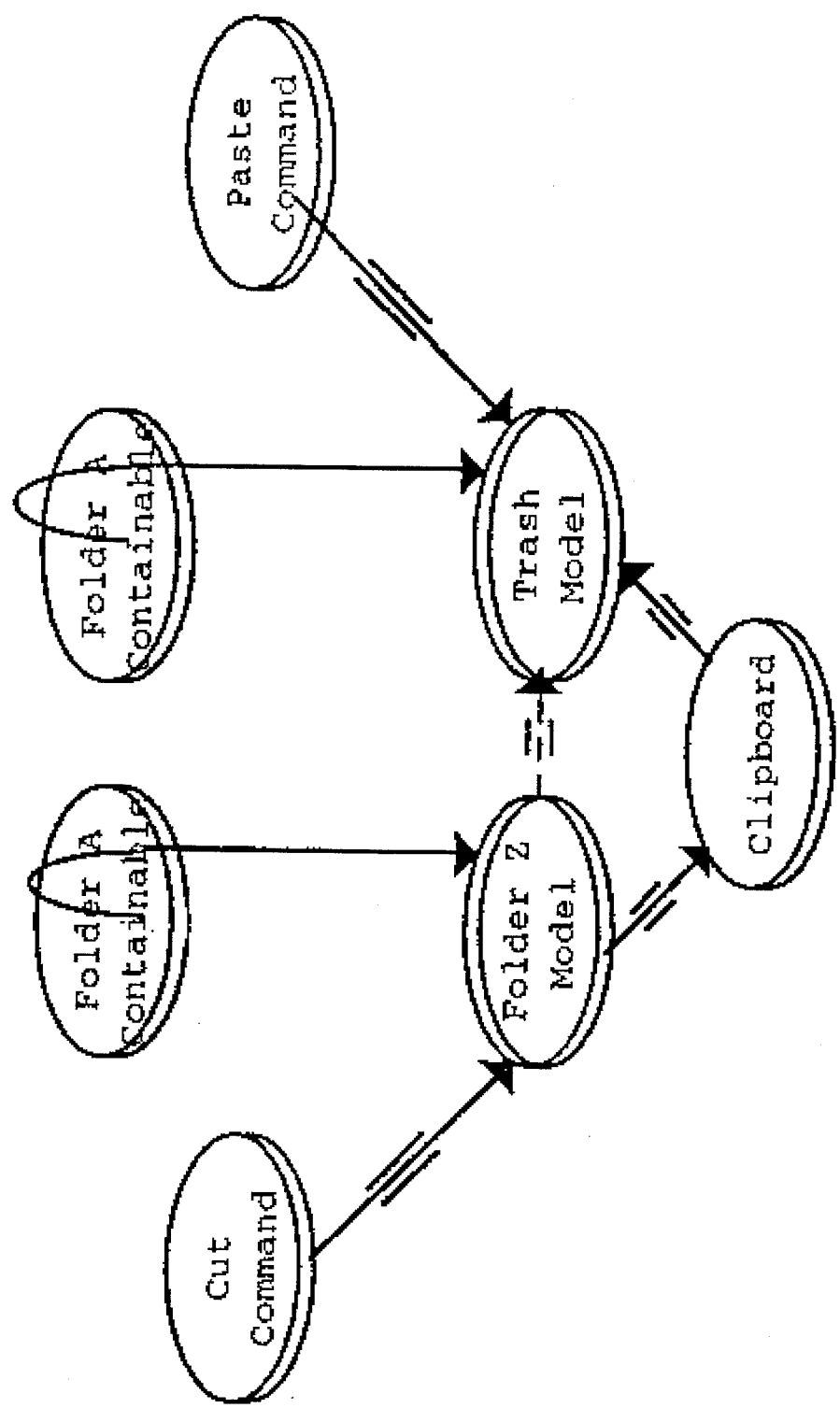
FIG. 30 is a VDL diagram illustrating the movement of a folder logic in accordance with a preferred embodiment.

Deleting a folder. drag Folder A from Folder Z and drop it into a Waste Basket (a reference to the Trash Can) or into the Trash Can. A VDL diagram illustrating the moving a folder logic is presented in FIG. 30.

Copying (moving) a containable from one folder to another folder. option-drag Document Foo from Folder X and drops it into Folder Y. If the copied document has any links, its links will be properly fixed-up. The moved document will be removed from the source folder.

Figure 31:
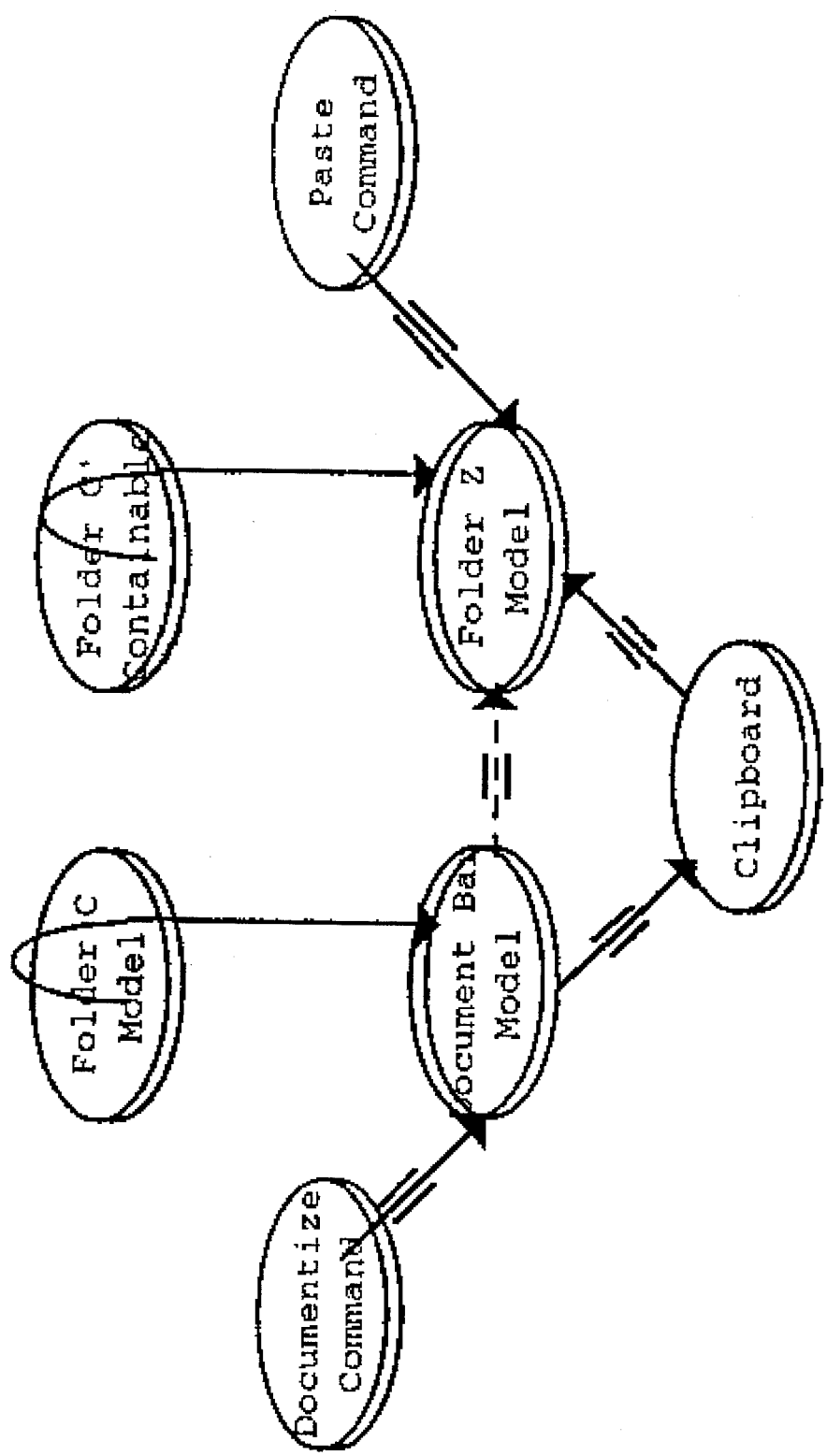
FIG. 31 is a VDL diagram illustrating the movement of a folder logic in accordance with a preferred embodiment.

Copying (moving) a containable from a folder to a document:: option-drag Document Foo from Folder Y to Document Bar. Since a document can also contain containables, Document Foo will appear as an icon in Document Bar. (The moved containable will be removed from the folder.) A VDL diagram illustrating the moving a folder logic is presented in FIG. 31.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A method for organizing information in a memory of a computer system, the memory having an address space for an object-oriented operating system and an address space for an application program, the method comprising the steps of:

(a) storing information defining a container class in the operating system address space of the memory, the container class being comprised of a data structure for holding information, a member function for constructing a container object from the container class, a first member function for inserting information identifying a containable object into the data structure, plurality of member functions for performing editing operations and a second member function for inserting information identifying an editing operation into the data structure;

(b) executing the constructing member function to instantiate a container object in the application program address space of the memory;

(c) executing the first inserting member function of the instantiated container object to insert information identifying a containable object into the data structure of the instantiated container object;

(d) executing one of the editing member functions in the instantiated container object to perform an editing operation on the containable object identified by information in the data structure of the instantiated container object; and (e) executing the second inserting member function to insert information identifying the editing operation performed in step (d) into the data structure of the instantiated container object so that the editing operation may be undone and redone.

2. A method as recited in claim 1, wherein step (c) comprises the step of:

(c1) executing the inserting member function to insert information identifying another container object into the data structure of the instantiated container object.

3. A method as recited in claim 1, wherein step (c) comprises the step of:

(c2) executing the inserting member function to insert information identifying a place object containing information representing a physical location.

4. A method as recited in claim 1, wherein the step (c) comprises the step of:

(c3) executing the inserting member function to insert information identifying an inbox object containing member functions for receiving messages.

5. A method as recited in claim 1, wherein the step (c) comprises the step of:

(c4) executing the inserting member function to insert information identifying an outbox object containing member functions for transmitting messages.

6. A method as recited in claim 1, wherein the step (c) comprises the step of:

(c5) executing the inserting member function to insert information identifying a boot set object containing member functions for booting the computer system.

7. A method as recited in claim 1, wherein the step (c) comprises the step of:

(c6) executing the inserting member function to insert information identifying a database query object containing information generated by a database query.

8. A method as recited in claim 1, wherein the step (c) comprises the step of:

(c7) executing the inserting member function to insert information identifying a content-based retrieval object containing information generated by a content-based database query.

9. A method as recited in claim 1, wherein step (d) comprises the steps of:

(d1) obtaining input from a user to select an editing operation; and (d2) executing one of the editing member functions in the instantiated container object to perform the selected editing operation on the containable object identified by information in the data structure of the instantiated container object.

10. A method as recited in claim 9, wherein step (d1) comprises the step of:

(d1a) obtaining user input to select an editing operation from the set of editing operations consisting of: copying, deleting, cutting, pasting, selecting, dragging, dropping, and moving.

11. A method as recited in claim 1, wherein the container class further comprises a member function for creating a presentation representing a container object and the method further comprises the step of:

(f) executing the presentation creating method to generate presentations of the instantiated container object as a window presentation, a frame presentation and an icon presentation.

12. A system for organizing information in a memory of a computer system, the memory having an address space for an object-oriented operating system and an address space for an application program, the system comprising:

(a) means for storing information defining a container class in the operating system address space in the memory, the container class being comprised of a data structure for holding information, a member function for constructing a container object from the container class, a first member function for inserting information identifying a containable object into the data structure, a plurality of member functions for performing editing operations and a second member function for inserting information identifying an editing operation into the data structure;

(b) means controlled by the application program for executing the constructing member function to instantiate a container object in the application program address space of the memory;

(c) means controlled by the application program for executing the first inserting member function to insert information identifying a containable object into the data structure of the instantiated container object;

(d) means controlled by the application program for executing one of the editing member functions in the instantiated container object to perform an editing operation on the containable object identified by information in the data structure of the instantiated container object; and (e) means responsive to a particular editing operation for executing the second inserting member function to insert information identifying the particular editing operation into the data structure of the instantiated container object so that the editing operation may be undone and redone.

13. A system as recited in claim 12, wherein the means for executing the first inserting member function is controlled by the application program to insert information identifying another container object into the data structure of the instantiated container object.

14. A system as recited in claim 12, wherein the means for executing the inserting member function is controlled by the application program to insert information identifying a place object containing information representing a physical location.

15. A system as recited in claim 12, wherein the means for executing the inserting member function is controlled by the application program to insert information identifying an inbox object containing member functions for receiving messages.

16. A system as recited in claim 12, wherein the means for executing the inserting member function is controlled by the application program to insert information identifying an outbox object containing member functions for transmitting messages.

17. A system as recited in claim 12, wherein the means for executing the inserting member function is controlled by the application program to insert information identifying a boot set object containing member functions for booting the computer system.

18. A system as recited in claim 12, wherein the means for executing the inserting member function is controlled by the application program to insert information identifying a database query object containing information generated by a database query.

19. A system as recited in claim 12, wherein the means for executing the inserting member function is controlled by the application program to insert information identifying a content-based retrieval object containing information generated by a content-based database query.

20. A system as recited in claim 12, including means for obtaining input from a user to select an editing operation; and means responsive to the selection of an editing operation for executing one of the editing member functions in the instantiated container object to perform the selected editing operation on the containable object identified by information in the data structure of the instantiated container object.

21. A system as recited in claim 20, wherein the means for obtaining user input selects an editing operation from the set of editing operations consisting of: copying, deleting, cutting, pasting, selecting, dragging, dropping, and moving.

22. A system as recited in claim 21, wherein the container class further comprises a member function for creating a presentation representing a container object and the system further comprises (f) means for executing the presentation creating method to generate presentations of the instantiated container object as a window presentation, a frame presentation and an icon presentation.

23. A container framework for use in a computer system having a processor, a volatile memory, a non-volatile memory having a plurality of separate volumes and a plurality of objects, each of the plurality of objects having object model information stored in the volatile memory and object model store information stored in one of the plurality of non-volatile memory volumes, the container framework comprising:

means for constructing a container object, the container object having a container model stored in the volatile memory and a container model store stored in the non-volatile memory;

means for inserting each of the plurality of objects into the container object, the inserting means comprising means for copying object model information for the each object into the container model and means for linking the container model information and the object model information into a containment hierarchy.

24. A container framework according to claim 23 wherein the inserting means comprises means for copying a reference to object model information for the each object into the container model.

* * * * *